US011561200B1

(12) United States Patent
Nechitailo

(10) Patent No.: US 11,561,200 B1
(45) Date of Patent: Jan. 24, 2023

(54) EDDY CURRENT DETECTOR

(71) Applicant: Nicholas V. Nechitailo, King George, VA (US)

(72) Inventor: Nicholas V. Nechitailo, King George, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 15/968,693

(22) Filed: May 1, 2018

Related U.S. Application Data

(60) Provisional application No. 62/492,995, filed on May 2, 2017.

(51) Int. Cl.
*G01N 27/9093* (2021.01)
*G01N 27/90* (2021.01)

(52) U.S. Cl.
CPC ..... *G01N 27/9093* (2013.01); *G01N 27/9006* (2013.01)

(58) Field of Classification Search
CPC .......... G01N 27/9033; G01N 27/9093; G01N 27/902; G01N 27/904; G01N 27/9046; B23B 47/00; B23B 49/00
USPC .. 324/200, 239, 207.13, 219, 234, 242–247, 324/500, 529, 530
See application file for complete search history.

(56) References Cited

U.S. PATENT DOCUMENTS

| 3,694,740 | A | * | 9/1972 | Bergstrand | G01N 27/902 324/227 |
| 3,718,855 | A | * | 2/1973 | Rogel | G01N 27/902 324/202 |
| 5,418,459 | A | * | 5/1995 | You | G01N 27/904 324/220 |
| 6,100,696 | A | * | 8/2000 | Sinclair | G01V 3/28 324/339 |
| 6,501,267 | B1 | * | 12/2002 | Kurokawa | G01N 27/904 324/242 |
| 2010/0231348 | A1 | * | 9/2010 | Hugget | G01H 1/003 340/3.42 |
| 2013/0193960 | A1 | * | 8/2013 | Nishimizu | G01N 27/9006 324/240 |

FOREIGN PATENT DOCUMENTS

| CN | 107297524 | * | 10/2017 | G01N 27/02 |
| FR | 2980267 | * | 9/2011 | B23B 47/00 |

* cited by examiner

*Primary Examiner* — Lee E Rodak
*Assistant Examiner* — Trung Q Nguyen
(74) *Attorney, Agent, or Firm* — Gerhard W. Thielman

(57) ABSTRACT

An eddy probe is provided for identifying non-homogeneous objects in a material. The probe includes a power supply, an oscillator to produce electrical excitation powered by said power supply, a plurality of eddy current detectors, each detector measuring eddy current density, a marker disposed adjacent said plurality for indicating a location on the material in response to a maximum of the eddy current density, and a housing for containing the power supply, oscillator, detectors and marker. The plurality can be two or three detectors. The marker can include a drill bit disposed adjacent the detectors, a transmission connecting to the drill bit; and an electric motor connecting to the transmission and powered by the power supply for rotating the drill bit.

9 Claims, 11 Drawing Sheets

EDDY CURRENT DETECTOR

CROSS REFERENCE TO RELATED APPLICATION

Pursuant to 35 U.S.C. § 119, the benefit of priority from provisional application 62/492,995, with a filing date of May 2, 2017, is claimed for this nonprovisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to instruments for detecting eddy currents. In particular, the invention relates to eddy current probes with a marker to denote local maximums in eddy current density.

Eddy currents were reportedly first observed by Frangois Arago, a mathematician, physicist, astronomer, and the France's twenty-fifth Prime Minister. In 1824, he observed what has been called "rotatory magnetism" in conductive bodies. These observations were completed and explained by Michael Faraday. Non-destructive evaluation (NDE) methods, also known as non-destructive inspection and nondestructive testing methods, enable the evaluation of subsurface features in various materials and structures without incurring their damage. Common NDE methods include ultrasonic, radiographic, eddy current-based and other methods.

Detection of eddy currents involves electromagnetic induction to search and characterize subsurface flaws in electrically conductive materials. Eddy currents can be described as closed loops of electrical current induced within conductors by a changing magnetic field in the conductor according to Faraday's law of induction. Eddy currents flow within conductors, in planes perpendicular to the magnetic field. They can be induced within nearby stationary conductors by a time-varying magnetic field created by an alternating current (AC) electromagnet or transformer, or by relative motion between a magnet and a nearby conductor. The magnitude of the current in a given loop is proportional to the strength of the magnetic field, the area of the loop, and the rate of change of flux, being inversely proportional to the resistivity of the material.

FIG. 1 illustrates an elevation view of eddy currents in a conductive material, as conventionally explained by the detection system 110 in a medium 120. A conductive coil 130 with an alternating potential across its terminals 140 produces a magnetic field 150, thereby inducing current loops 160 in the medium 120, including eddy currents 170. According to Lenz's law formulated in 1834, the direction of induced current flow in the medium 120 is such that its magnetic field will oppose the change of magnetic flux that caused the current flow. Eddy currents 170 produce a secondary field that cancels a part of the external field and causes some of the external flux to avoid the conductor.

This effect is employed in eddy current brakes which are utilized to stop rotating power tools quickly when they are turned off. French physicist Leon Foucault is credited with having discovered eddy currents. In 1855, he found that the force required for the rotation of a copper disc becomes greater when it is made to rotate with its rim between the poles of a magnet. The disc becomes heated by the eddy current induced in the metal.

Due to the electric resistance of the conductor, some energy dissipates as heat in the material. Eddy currents 170 are a cause of energy loss in AC inductors, transformers, electric motors, generators, and other AC machinery, requiring special construction such as laminated magnetic cores or ferrite cores to minimize them. Eddy currents are also used to heat objects in induction heating furnaces and equipment. Apparently the first use of eddy current for non-destructive testing took place in 1879 when David E. Hughes conducted his metallurgical sorting tests. The development of the eddy current NDE methods slowly progressed until the late 1940s when Friedreich Föster started developing and marketing eddy current test instruments. By the late 1960s, his laboratory developed a product line covering virtually every application of the eddy current test method.

The penetration depth of eddy currents depends on the excitation frequency and probe size. Some eddy current systems use sinusoidal alternating current of a chosen frequency. In the 1970s, an equipment manufacturer called "Intercontrolle" of France, advanced this NDE method by using a multi-frequency approach. Driving a test coil at multiple frequencies helped to overcome some limitations of the eddy current method. In addition, pulsing eddy current testing equipment uses a step function voltage containing a broad range of frequencies to excite the probe. In the 1980s, eddy current NDE equipment was used to inspect aircraft structures for cracks near fasteners.

Eddy current inspection has also been performed for graphite-epoxy solid rocket motor canisters. The development of microprocessors for eddy current instruments took place in the 1980s and helped to improve user friendliness in the application of eddy current sensors. Subsequently, a rather sophisticated signal processing and imaging instrumentation was added, enabling the automatic mixing of multi-frequency signals to improve images of identified subsurface features. The development of digital microprocessor-based eddy current instruments offered significant improvements over analog instruments.

In the early 1990s, arrays of low-frequency eddy current probe arrays were tested. Defects as small as 1 mm were detected under 1.6 mm aluminum aircraft skins. Two or more closely positioned eddy current probes generated overlapping zones that enhanced each other's eddy currents. In addition, a marker composed of steel and Metglas was developed to enhance the pickup signal, funded by the U.S. Air Force in 1996-1998. Testing of this inexpensive all-digital hand-held eddy current scanner was successful, and the two- and three-probe scanners produced significantly improved images of subsurface features in aluminum and graphite fiber-epoxy plates.

For multi-layer structures, eddy current NDE methods may perform better than ultrasonic and thermal imaging methods. One primary reason is that eddy current methods do not require bonded layers. In addition, inspection is possible in high-temperature environments by using eddy current methods. Modern eddy current NDE tools are very sensitive and can detect small cracks in ferromagnetic and non-ferromagnetic materials. Modern application areas for eddy current NDE include: surface inspection in aerospace and petrochemical industries, inspection of steam generator tubing in nuclear plants, and inspection of heat exchangers tubing in power and petrochemical industries.

Domestic development of various NDE methods appears to have decelerated since the 2000s and through the 2010s. According to Google Trends, between the years of 2004 and 2017, interest in eddy current methods has declined by 50-70%. For the same period, the interest in nondestructive testing and nondestructive evaluation has declined by 60-90%. The number of engineers and scientists working in the NDE area has also declined. Older technical experts retired while younger engineers are rarely interested in the NDE area, considering the technology somewhat dated and unattractive. Concurrently, the demand for the non-destructive evaluation of various materials and structures remains high, and will most like continue to increase.

Corrosion is a very expensive problem; it costs the Department of Defense $25M per year. This amount is probably triple to account for corrosion expenses in commercial fleet, oil and gas pipes, automotive industry, etc. Another area of application is assembly of aircraft when graphite-epoxy panels need to be riveted to holes in aluminum or composite frames. Improved methods for finding and marking hole centers are thus needed to assess structural integrity and to predict service life of structural materials based on their service history and aging mechanisms. Materials of interest include aged composites and metals with localized indentations, delamination, cracks, voids, as well as flame- and corrosion-damaged areas.

There is a need for improved methods to assess the structural integrity and predict the service life of structural materials based on their service history and aging mechanisms. Materials of interest include aged composites and metals with localized indentations, delamination, cracks, voids, as well as flame- and corrosion-damaged areas.

Eddy current techniques have several advantages over competitive ultrasonic and thermal approaches in nondestructive characterization of multiple layer structures. In contrast to ultrasonic techniques, eddy current methods do not require a mechanical bond between layers and thus are more applicable to the technology of aircraft assembly. Existing eddy current systems typically contain one probe or an array of spaced probes, depending on the area of structure to be inspected. The precise location and identification of subsurface features and objects such as holes and edges in multi-layer structures using an eddy current instrument is a complex problem stemming from the interaction between the eddy current probe and the multiple layer material, discontinuities at the edges of subsurface features and finite length scales in magnetic and electrical phenomena used in feature identification. Optimization of the precision of locating subsurface features requires modeling of eddy current probe interaction with the multiple layer structure to reduce effects caused by finite probe size and magnetic field inhomogeneity, development of hardware to minimize multiple edge effects and application of signal processing software to separate signal features from material-induced noise.

Conventional eddy current systems for non-destructive location of hidden features and objects and non-destructive inspection and characterization of materials typically include a sinusoidal or pulsed signal source, sending and receiving eddy current probes, a means of monitoring the impedance of the receiving eddy current probe and a signal processing system that filters the noise and extracts the signal from the changes in probe impedance.

SUMMARY

Conventional eddy probes yield disadvantages addressed by various exemplary embodiments of the present invention. In particular, various exemplary embodiments provide an eddy probe for identifying non-homogeneous objects in a material. The probe includes a power supply, an oscillator to produce electrical excitation powered by the power supply, a plurality of eddy current detectors, each detector measuring eddy current density, a marker disposed adjacent said plurality for indicating a location on the material in response to a maximum of the eddy current density, and a housing for containing the power supply, oscillator, detectors and marker. The plurality can be two or three detectors. Other various embodiments provide for the marker including a drill bit disposed adjacent the detectors, a transmission connecting to the drill bit; and an electric motor connecting to the transmission and powered by the power supply for rotating the drill bit.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGS. 16A and 16B are tabular views device characteristics;

DETAILED DESCRIPTION

Figure 1:
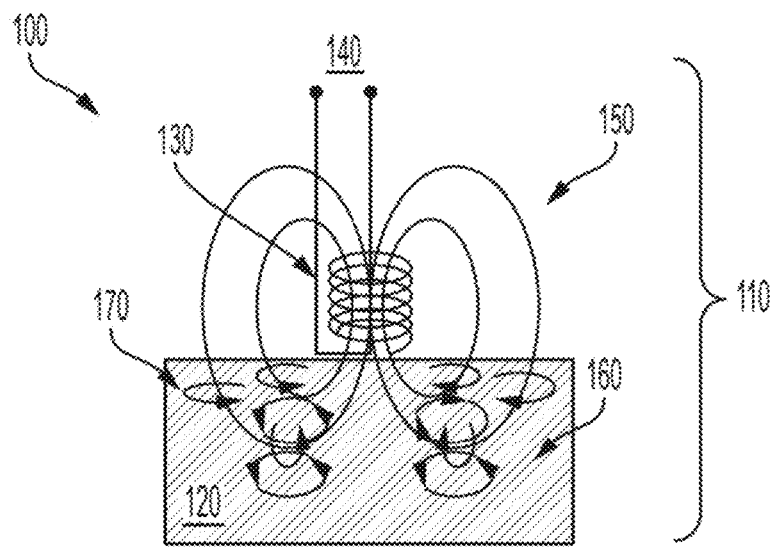
FIG. 1 is an elevation view of a conventional eddy detector.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The exemplary probe provides much better image quality of the hidden features at a greater depth. The disclosure generally employs quantity units with the following abbreviations: length in millimeters (mm) and micrometers (μm), time in seconds (s), angles in degrees (°) or radians, frequency in hertz (Hz), electric current in amperes (A), electrical resistance in ohms (Ω), electrical conductance in siemens (S, reciprocal of ohms Ω), electric potential in volts (V), and magnetic inductance in henrys (H).

There is a need for improved techniques to assess structural integrity and to predict service life of structural materials based on their service history and aging mechanisms. Laminated materials of interest include aged metals and composites with localized indentations, delamination, cracks, voids, as well as flame- and corrosion-damaged areas. A separate objective is related to the aircraft manufacturing. Metal frames of some aircraft need to be covered with fiber-graphite-epoxy composite panels. Therefore, there is a need for a device to "see through" the composite panels, to locate holes pre-drilled in the metal frames. Subsequently, matching through-holes are drilled in the composite panels, though which fasteners, such as rivets, are inserted to attach the panels to the frame.

Exemplary embodiments focus on compact non-destructive evaluation (NDE) eddy current devices suitable for the inspection of material damage in various rather small locations as well as for locating subsurface predrilled holes. More generally, exemplary embodiments enable identification of non-homogeneous objects in a material. The goal involves locating subsurface holes, slots, butt joints, wires, and removed (corroded) areas. Exemplary embodiments provide an inexpensive eddy current hand-held system. A first embodiment includes two eddy current probes generating signals with 180° phase shift within a hand-held housing. A second embodiment includes three eddy current probes with 120° phase shift.

The embodiments can include a marker in the center of the handheld device to enable producing surface images of defects located underneath and to enhance the clarity of eddy current scans. In addition, several signal processing algorithms were developed and implemented for filtering noise, mainly produced by graphite fibers. The role of the marker is two-fold:
(1) to mark hidden images on the sample surface, and
(2) to enhance and improve eddy current penetration characteristics.

Periodic scans can be performed for the same structure, for example nozzle of a rocket (or a structure in close proximity to the missile nozzle, subjected to flame damage), using the same eddy current system. These images can be stored and subsequently compared to each other. This enables visualization of material aging processes to access service life of various structural components. The marker can be used to depict subsurface feature and their propagation in time. The signals obtained from the system of eddy current probes were processed by using several signal processing methods:
(1) digital summation,
(2) cross correlation, and
(3) least squares fit.

Figure 2:
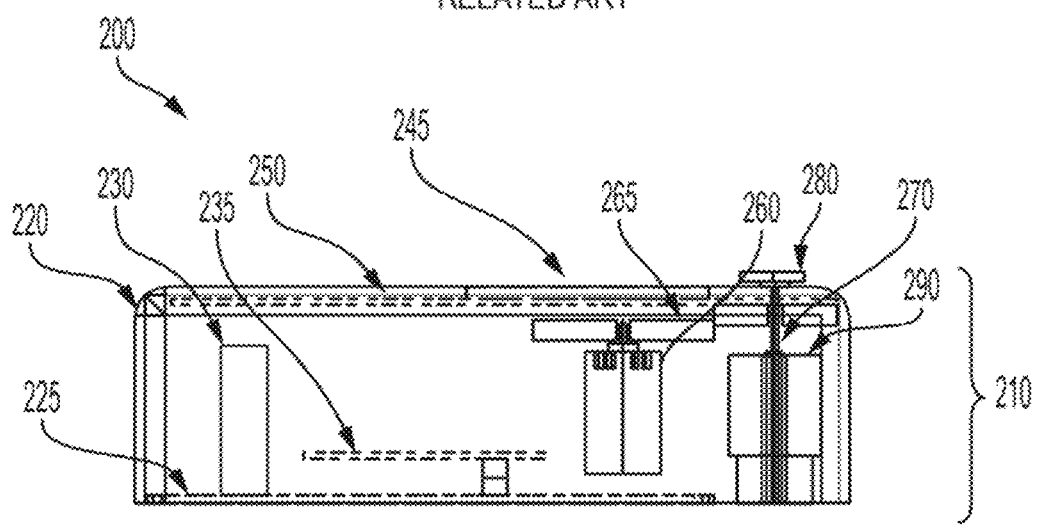
FIG. 2 is an elevation view of an exemplary prototype eddy detector.

FIG. 2 shows an elevation view 200 of a first embodiment of the eddy probe 210 encased in a plastic housing 220. An excitation board 225 and an electric battery 230 are disposed at the bottom of the housing 220. An alternating-to-direct (A/D) converter board 235 communicates with the excitation board 225, which is powered by the battery 230. A display board 245 is disposed atop the housing 220 to provide visual feedback to an operator via signal strength indicators 250. An electric motor 260 connects to a transmission 265 to drive a marking device 270 controlled by an actuator button 280. A set of two probes 290 are disposed adjacent the marking device 270.

Figure 3:
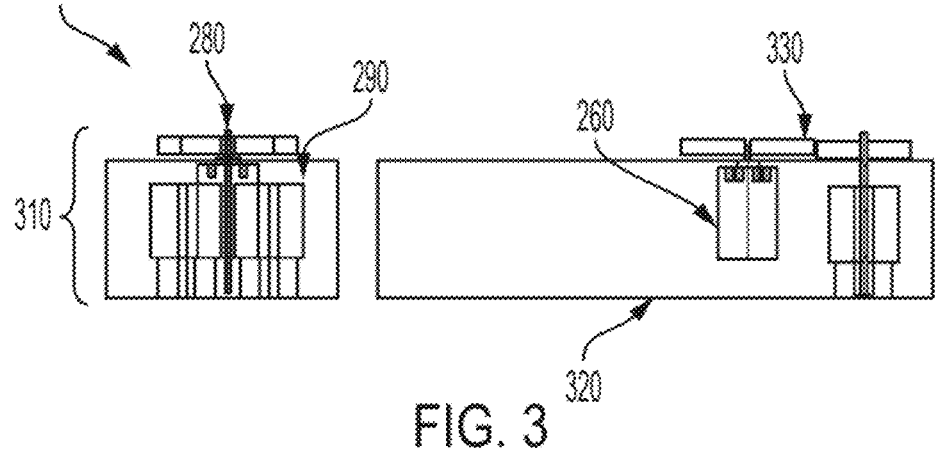
FIG. 3 is an elevation view of the exemplary eddy detector.
Figure 4:
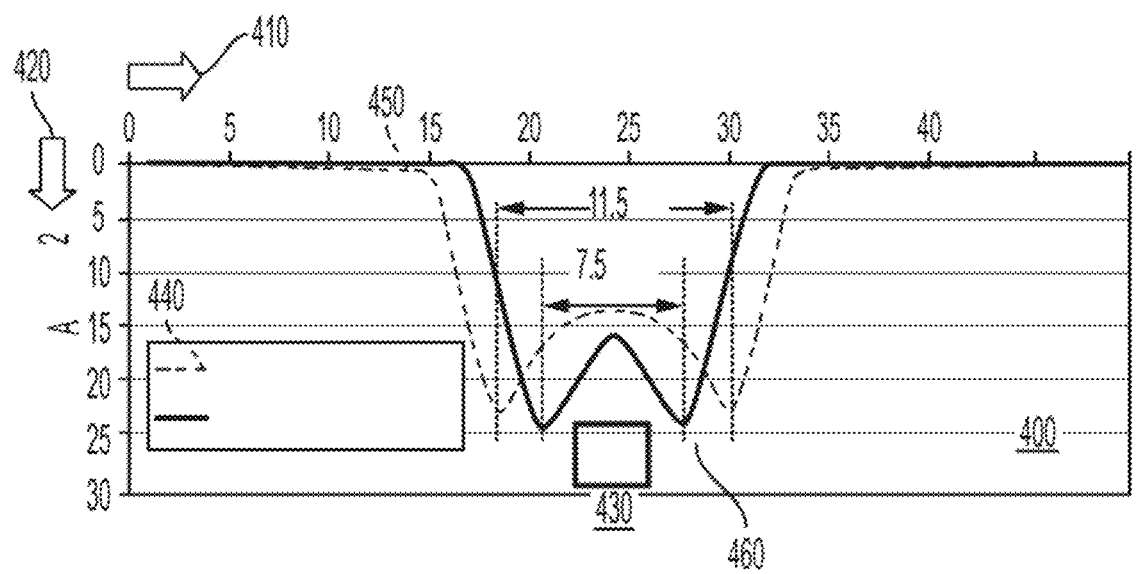
FIG. 4 is a graphical view of driving and pick-up coil overlap.

FIG. 3 shows elevation views 300 of a second embodiment of the eddy probe 310 contained within a housing 320. The battery 230 and boards 225 and 235 are omitted from this illustration. Actuator buttons 330 activate the motor 260 and the marking device 270. The probe 310 includes a set of three probes 290. FIG. 4 shows a graphical view 400 of scan distance 410 (in mm) as the abscissa versus area 420 (in $mm^2$) as the ordinate. The slot axis 430 is shown by a center block. The dash line 440 maps overlap with the pick-up coil, while the solid line 450 maps overlap with the driving coil. These W-shape trends are wider for lower frequencies, such as −100 Hz and narrower for higher frequencies, such as −1 kHz. The area peaks for the dash line 440 extend 11.5 mm, and for the solid line 450 extend 7.5 mm.

Figure 5:
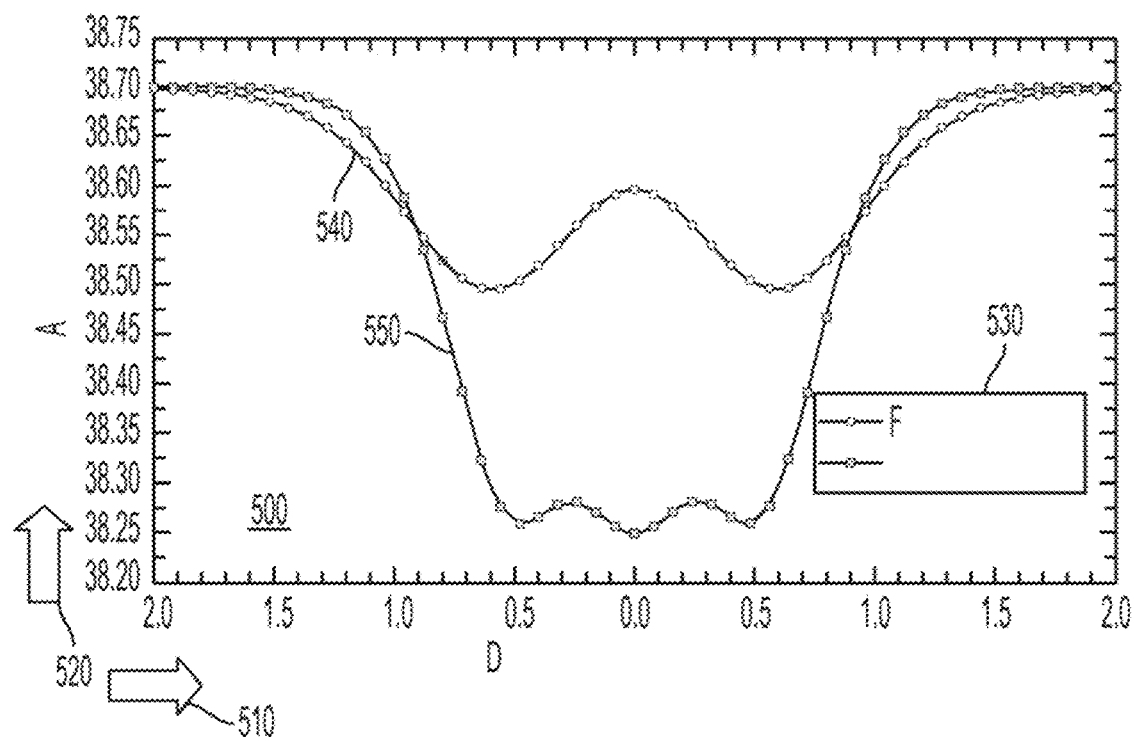
FIG. 5 is a graphical view of full and half-size signals in displacement.

FIG. 5 shows a graphical view 500 of displacement 510 (in mm) as the abscissa versus signal strength 520 (arbitrary units) as the ordinate. A legend 530 distinguishes lines marked by open circles 540 for a full-size probe and filled squares 550 for a half-size probe.

Figure 6:
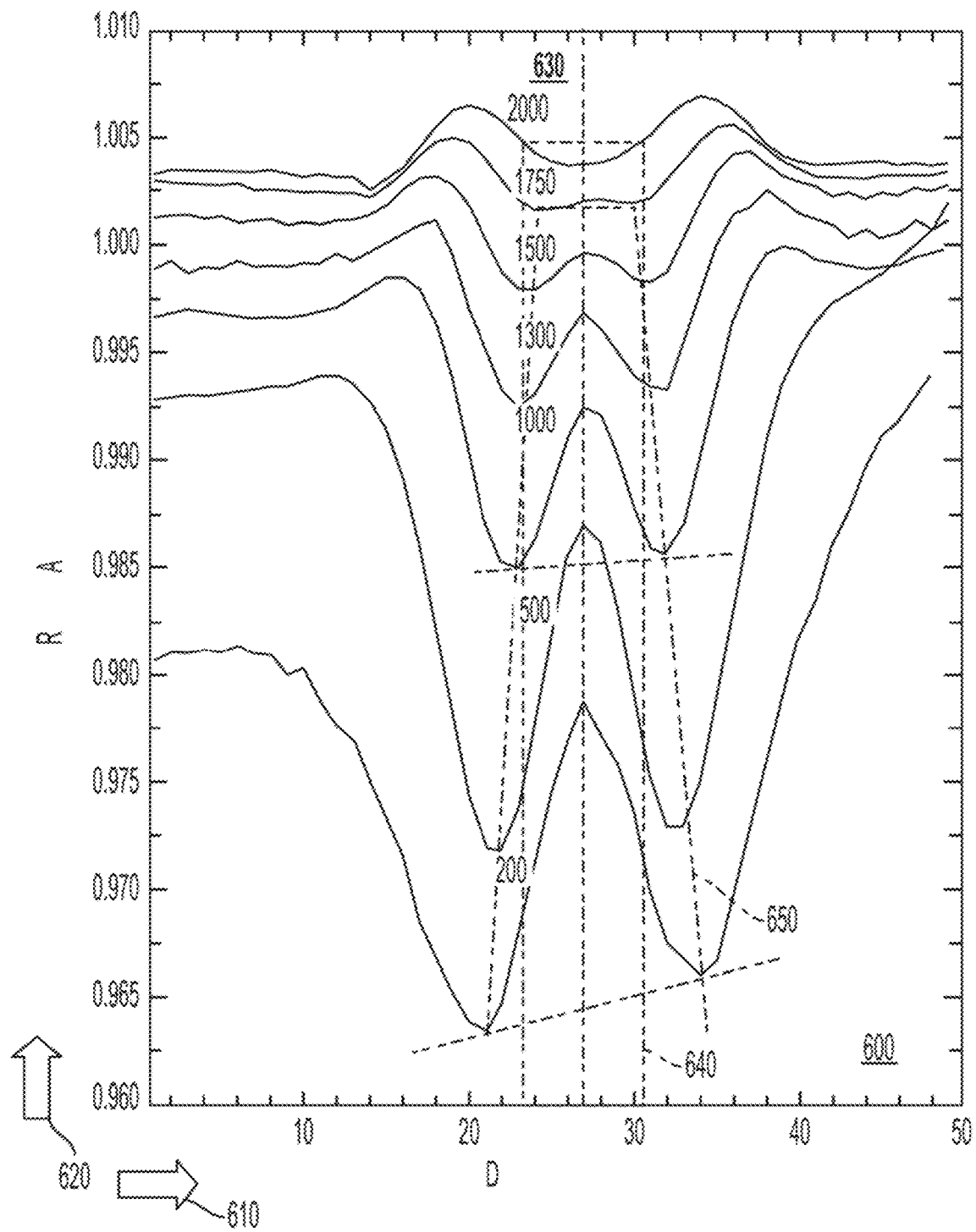
FIG. 6 is a graphical view of amplitude responsive to distance.
Figure 7:
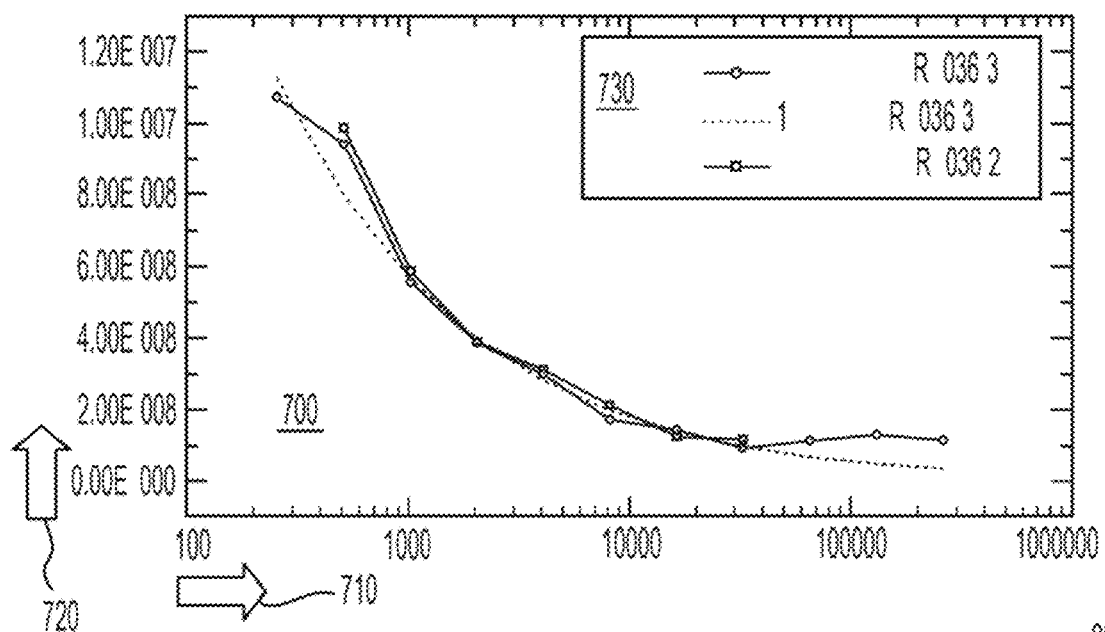
FIG. 7 is a graphical view of noise versus sample number.

FIG. 6 shows a graphical view 600 of distance 610 (in mm) as the abscissa versus relative amplitude 620 as the ordinate, with an axis of symmetry 630 at the hole center. FIG. 7 shows a graphical view 700 of number of samples 710 as the abscissa (in logarithmic scale) versus noise voltage 720 as the ordinate. A legend 730 distinguishes lines with filled circles for a three-probe RS036-3, dash of the reciprocal of the square-root of the sample number, and filled squares for a two-probe RS036-2. All three lines exhibit decreasing noise with increasing number.

Figure 8:
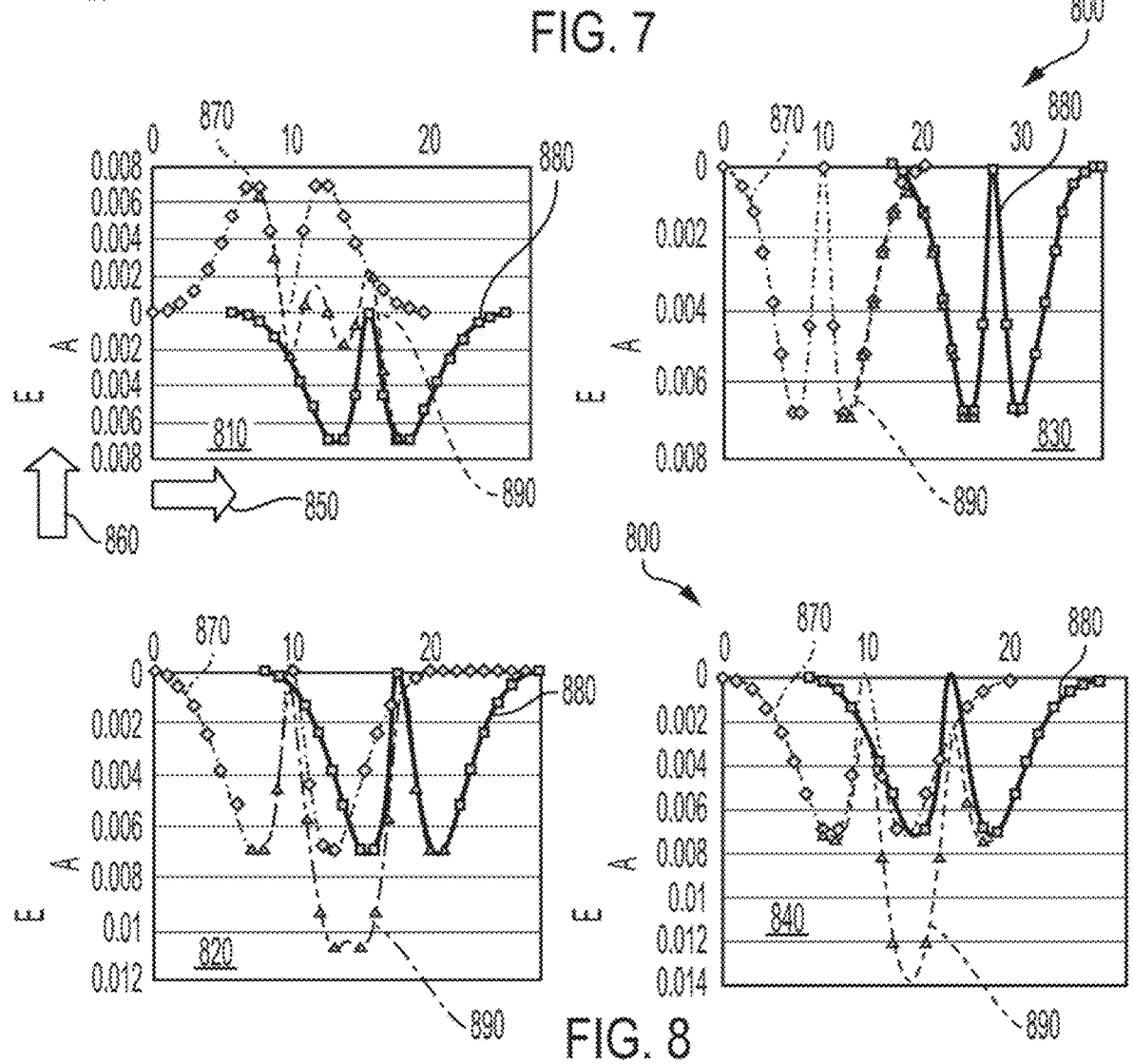
FIG. 8 is a set of graphical views of eddy current density.

FIG. 8 shows graphical views 800 of eddy density variation with position as a series of plots: 810, 820, 830 and 840 as the Effect of Phase Shift and Distance between Probes on the Superposition of Eddy Current. Horizontal position 850 (in mm) forms the abscissa, while density 860 (in $mA/mm^2$) denotes the ordinate. Each plot identifies three lines marked by solid diamonds 870, squares 880 and triangles 890. The diamond line 870 corresponds to the eddy current density along the top surface of the second layer containing a hole. The square line 890 is the same for the second probe. The triangle line 890 is the sum of the two eddy current distributions denoted by lines 870 and 880. The curves corresponding to the first and second probes 290 are similar to that of scans having multiple minima or maxima with a "null" point in the center characterized by cancellation of eddy currents. Plots 820 and 830 present a sequence of events when probes driven out of phase are located either 8 mm from one another in plot 830 separated by 6.0 mm from one another in plot 840. As can be seen from the charts, plot 840 is the most desirable scenario for enhancement of eddy current above the hole; this configuration suggests that the coils should be placed as close to each other as possible and were driven with 180° phase shift.

Figure 9:
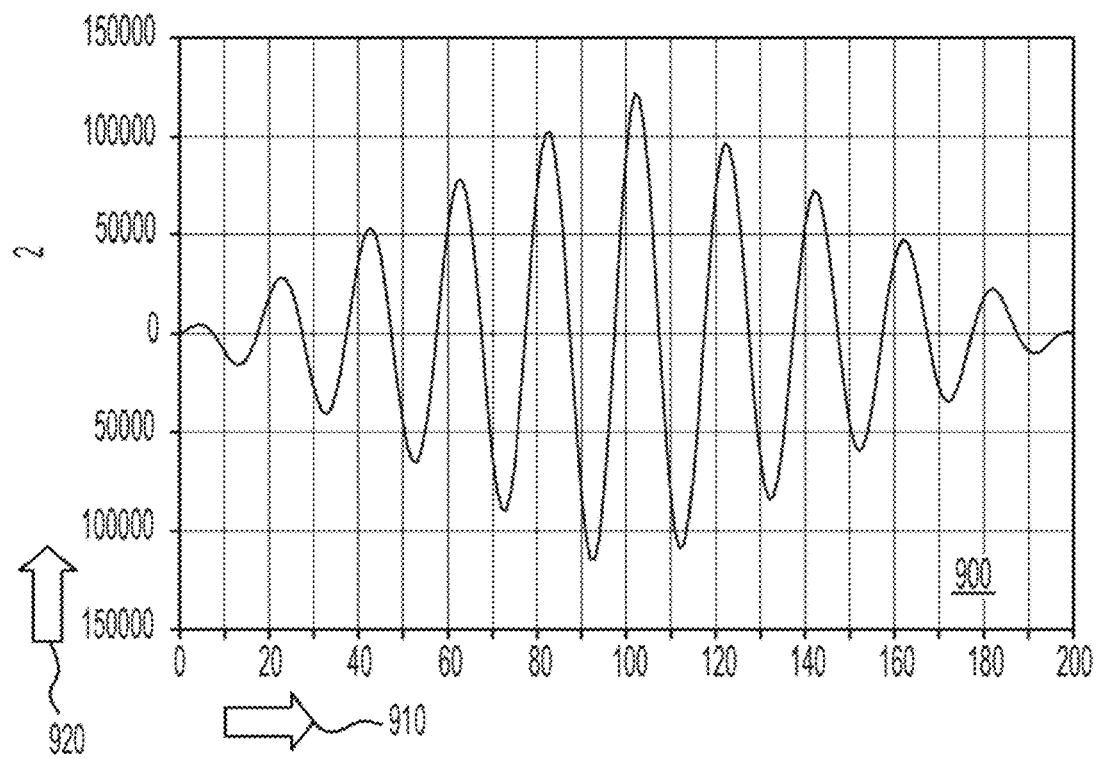
FIG. 9 is a graphical view of cross correlation versus sample number.

FIG. 9 shows a graphical view 900 of sample number 910 as the abscissa versus oscillatory cross correlation 920 (in $V^2$) as the ordinate. The hardware design of the signal processing module need not sum more than 16,384 points. The A/D converter is sampling at 100,000 samples/sec. Thus, the sum is updated for display more than six times per second. These data are important in specifying the optimum number of sample points for the handheld instrument design.

Figure 10:
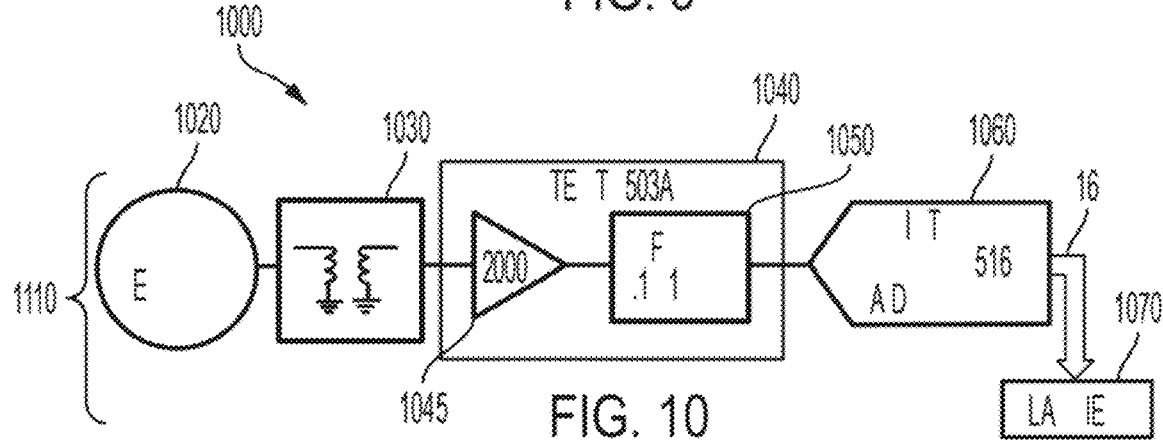
FIG. 10 is a schematic diagram view of a noise test system.
Figure 11:
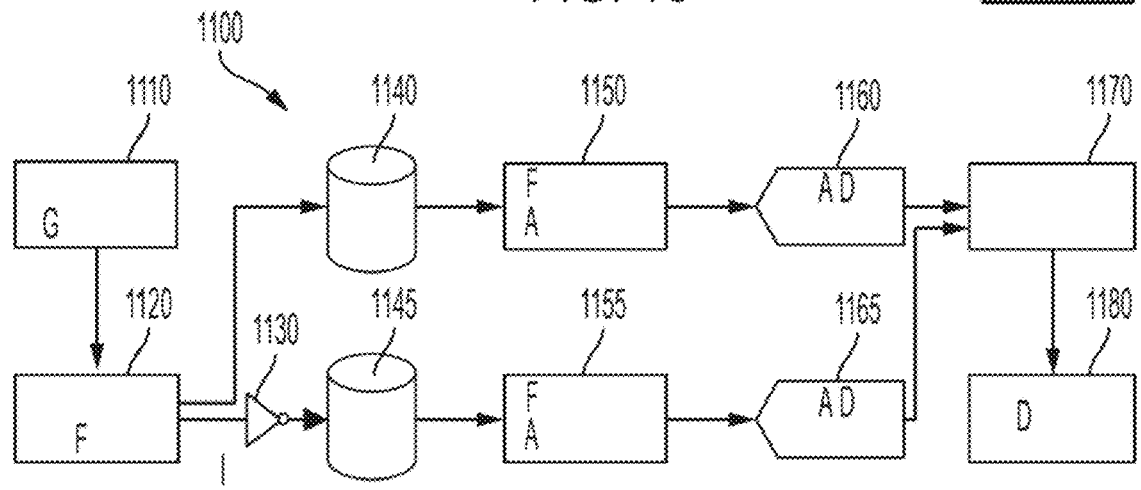
FIG. 11 is a block diagram view of an exemplary probe system.

FIG. 10 shows a block diagram view 1000 of a noise test system 1010. An oscillator 1020 produces excitation for a sinusoidal signal that feeds into a probe 1030. A TEK Tm503A amplifier includes an operational amplifier 1045 and a low-pass filter 1150, which supplies the resulting signal to an IOTech wavebook 516 A/D converter 1060, for which results are displayed in labview 1070. FIG. 11 shows a block diagram view 1100 of the exemplary detector 210 and operation. The oscillator 1020 generates a signal 1110 input to a bypass filter 1120, which splits between an inverter 1130 and a first probe 1140, with the inverter 1130 feeding to a second probe 1145. The probes 1140 and 1145 send their feedback signals to respective filter-amplifiers 1150 and 1155, and then to respective A/D converters 1160 and 1165 before being combined by a signal processor 1170 and then a display 1180.

Figure 12:
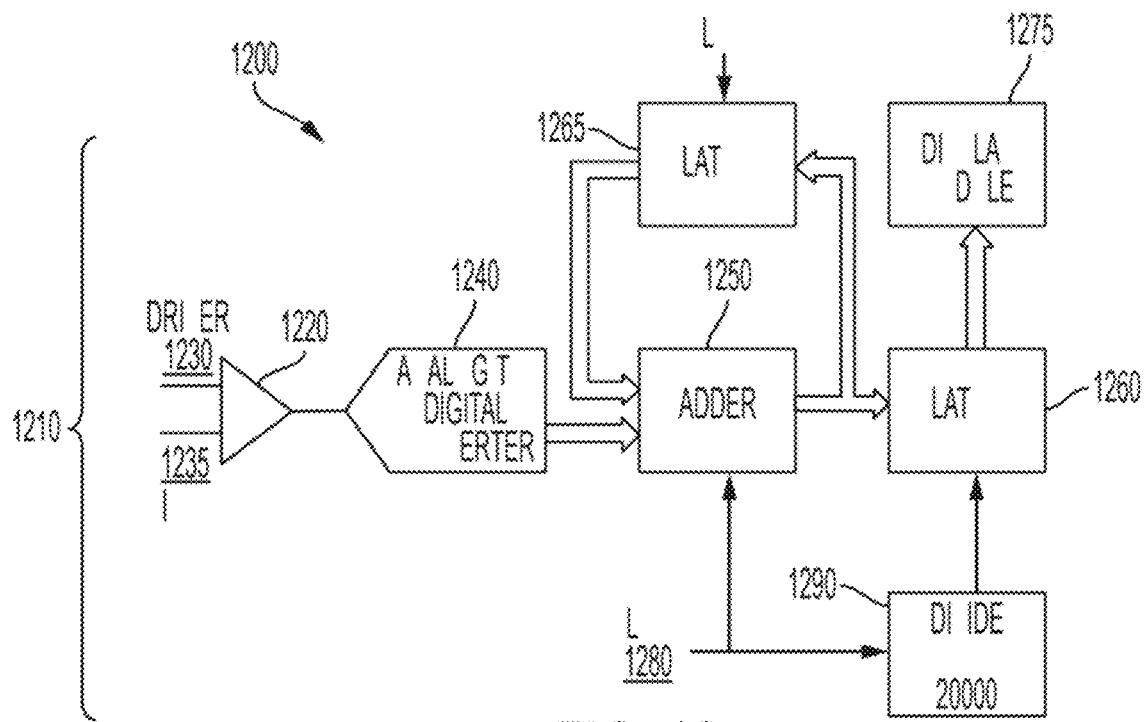
FIG. 12 is a block diagram view of an exemplary probe system.
Figure 13:
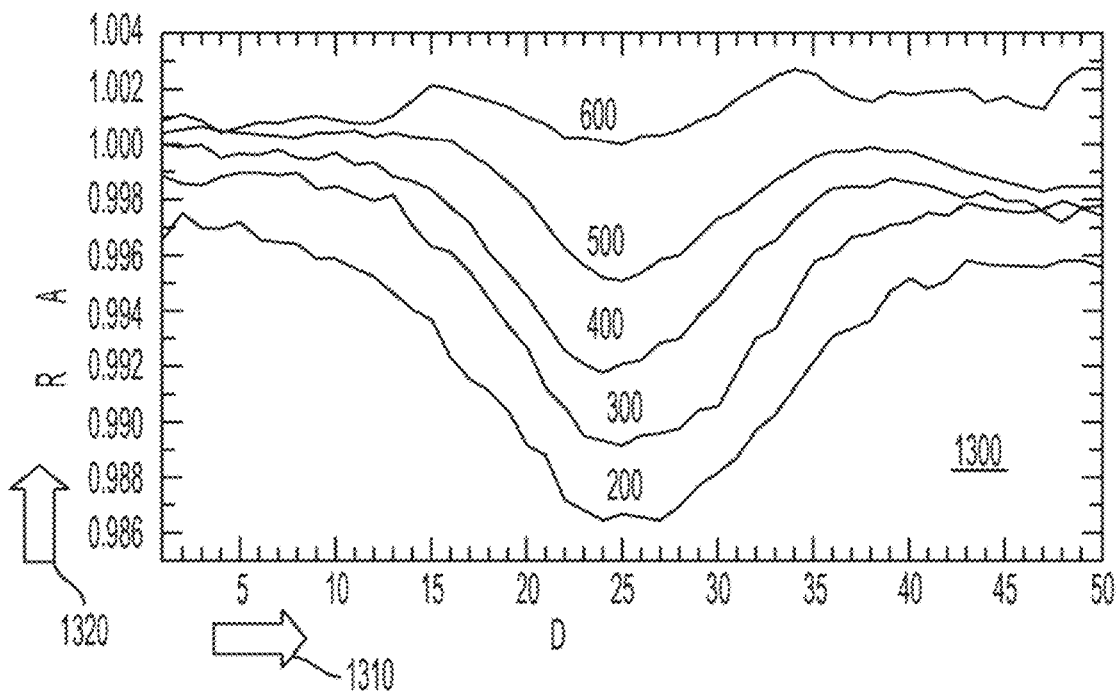
FIG. 13 is a graphical view of a amplitude versus distance.

FIG. 12 shows a block diagram view 1200 of a probe 1210 in operation. An amplifier 1220 combines signals from a driver 1230 and a pickup 1235 for submission to an A/D converter 1240. An adder 1250 receives signals from the A/D converter 1240, which relays the combined signal to an adder 1250, which forwards the combined signal to first and second latches 1260 and 1265. The first latch 1260 sends the signal to a display module 1275. The second latch 1265 sends a feedback to the adder 1250. A clock 1280 provides a timing signal to the adder 1250 and to a divider module 1290 that rescales the clock signal. FIG. 13 shows a graphical view 1300 of system response involving distance 1310 as the abscissa versus relative amplitude 1320 as the ordinate. The response involves a 3.5 mm slot in the layer beneath the 6.35 mm aluminum top surface when excited in a frequency range 200 Hz to 600 Hz. The trough at 26 mm from the origin represents the signal strength at the center of the slot.

Figure 14:
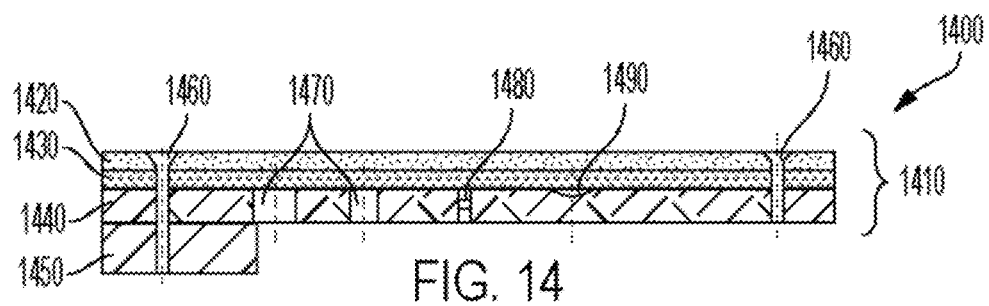
FIG. 14 is a set of elevation and plan views of a test sample.
Figure 15:
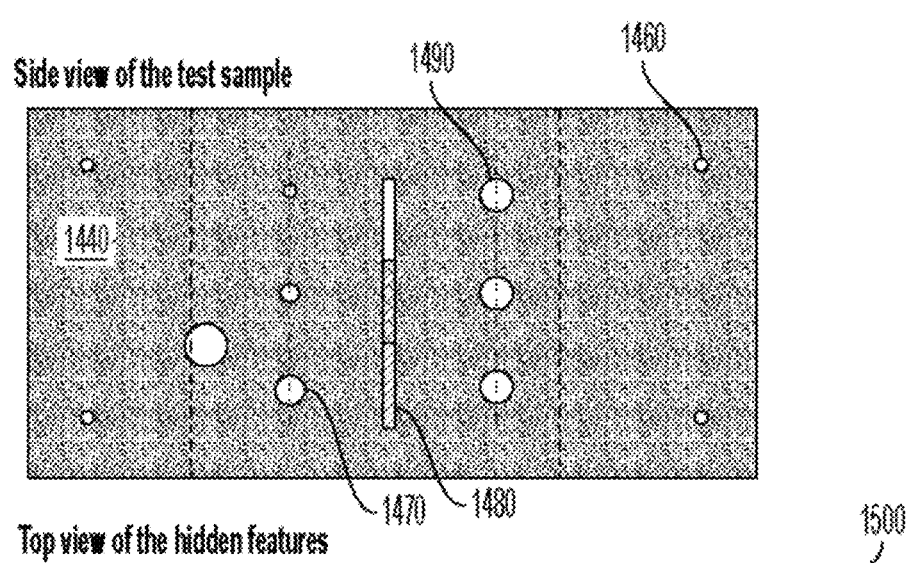
FIG. 15 is a contour map view of a current density for the test sample.

FIG. 14 shows plan and elevation views 1400 of a laminated test sample 1410 for investigation by the exemplary eddy detection device 210. The sample 1410 includes first 7075-T6 aluminum alloy layer 1420 over whose surface the device 210 travels, second graphite-epoxy layer 1430, third 2024-T3 aluminum alloy layer 1440 and a mount 1450. Various intrusions include assembly fasteners 1460, through holes 1470, slots 1480, and gaps of reduced thickness 1490. FIG. 15 shows a contour plot view 1500 of the device's display response for the test sample 1410 for alloy layer 1440, Slots 1480 are shown at between 30 and 45 on the horizontal 1510 and at about 60 on the vertical 1520. A through-hole 1470 is shown centered at 18 at the horizontal and 18 on the vertical.

Figures 16, 19:
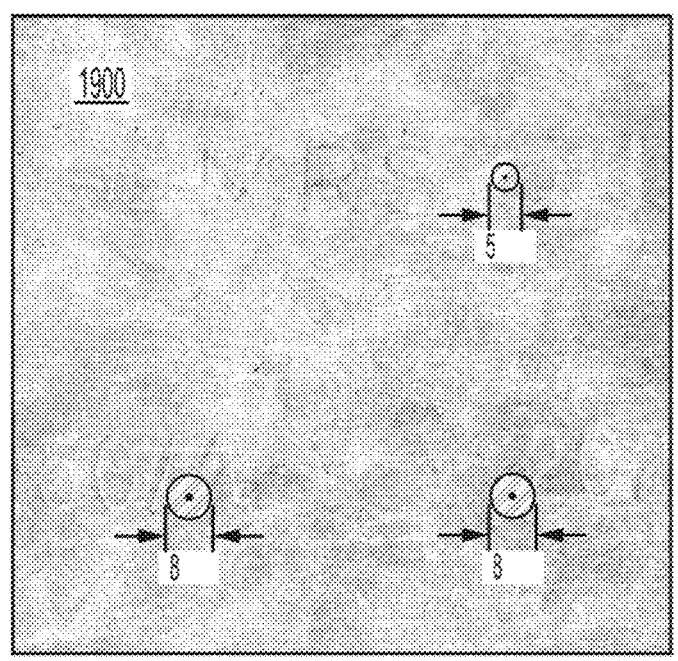
FIG. 19 is a photographic view of holes marked after identification.
Figure 16A:
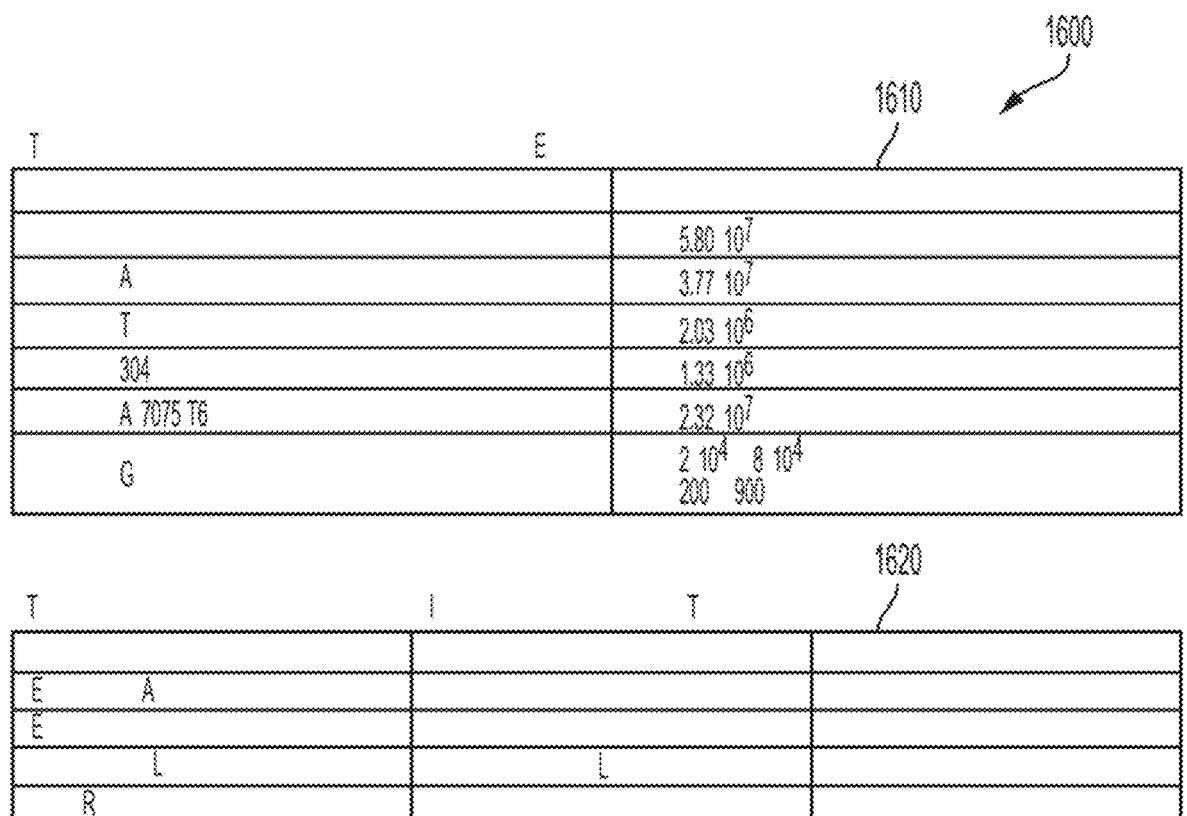

FIGS. 16A and 16B show tabular views 1600 of characteristics regarding the instrumentation and testing materials. Table 1 1610 compares electrical conductance of various materials. Table II 1620 compares signal processing techniques. Table III 1630 compares generations of ADEC instruments. Table IV 1640 shows system sensitivity at various excitation frequencies. Table V 1650 shows specifications for the exemplary eddy current detector 210.

Figure 17:
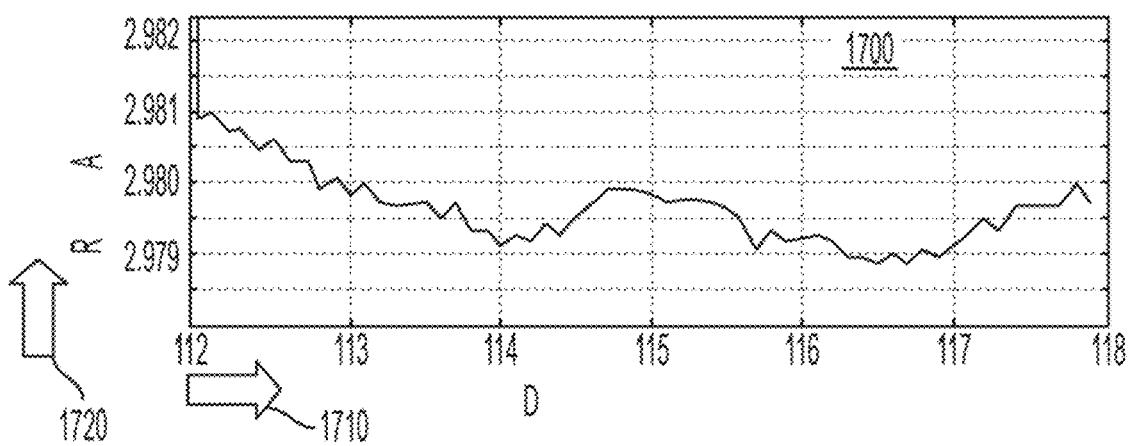
FIG. 17 is a graphical view of slot amplitude versus distance.
Figure 18:
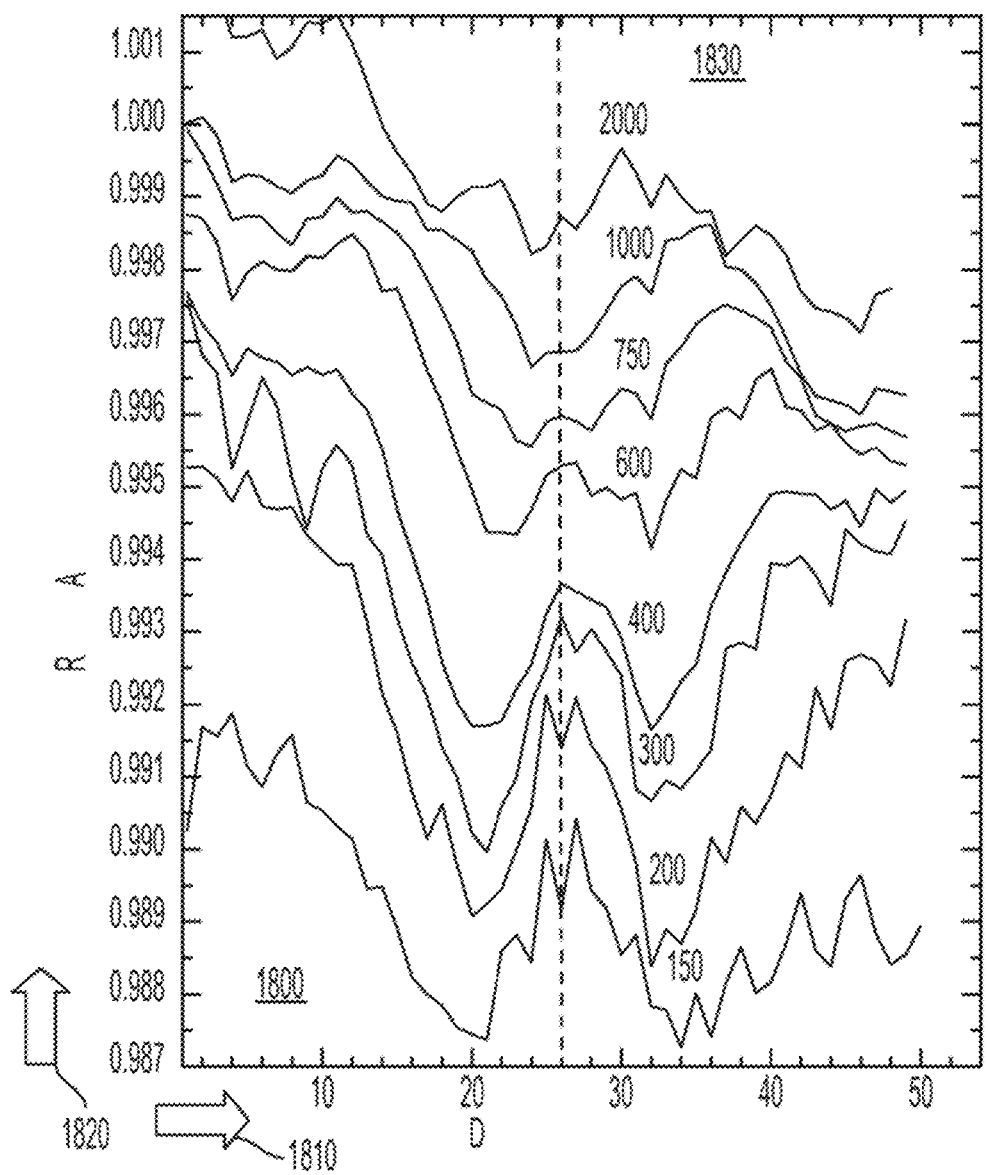
FIG. 18 is a graphical view of hole amplitude versus distance.

FIG. 17 shows a plot view 1700 of distance from origin 1710 (in mm) as abscissa versus relative amplitude 1720 as ordinate for the slot 1470. The resulting curve averages about 2.975 across the distance from 112 mm through 118 mm. This represents a fine scan of the subsurface slot 1470 with spatial resolution of 0.1 mm. FIG. 18 shows a plot view 1800 of distance from the origin 1810 (mm) as abscissa versus relative amplitude 1820 as ordinate. A centerline 1830 identifies the center of a hole 1470. FIG. 19 shows a photographic view 1900 of an aluminum 2024T3 top panel indicating the accuracy of the exemplary digital eddy current instrument after the drilling of holes.

Figure 20:
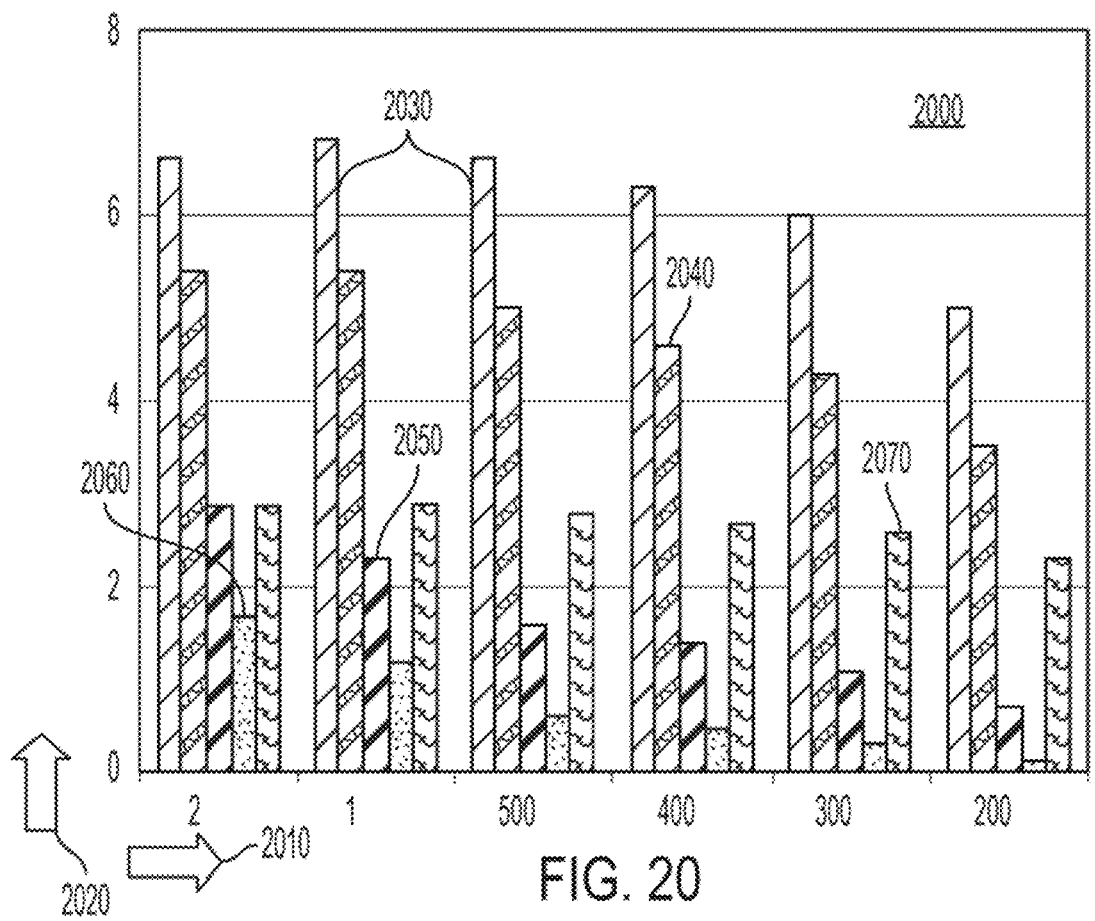
FIG. 20 is a graphical view of a voltage versus marker configuration.
Figure 21:
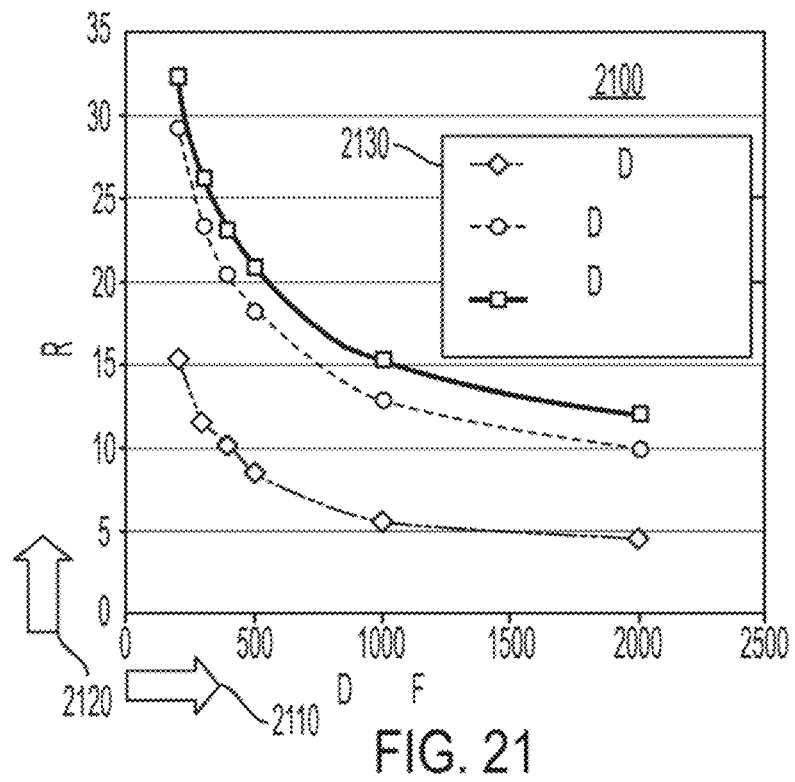
FIG. 21 is a graphical view of a voltage ratio versus driving frequency.

FIG. 20 shows a graphical view 2000 of a bar graph with driving frequency 2010 (Hz) as abscissa versus voltage (V) 2020 as ordinate. The bars from left-to-right for these frequencies denote pickup voltages for RS036-2 with through hole, drill bit and Metglas foil 2040, for RS036-2 probe with a through hole and drill bit 2050, for RS036-2 probe with a through hole 2060, for RS036-1 probe, and excitation voltage 2080. The signal shows a fifty-fold increase from the RS036-1 and RS036-2 probes. FIG. 21 shows a graphical view 2100 of driving frequency 2110 (Hz) as abscissa versus voltage ratio 2120 (dB) as ordinate, with a legend 2130 identifying diamond line without drill bit, circle line with drill bit, and square line with drill bit and Metglas, with progressive increases based on these enhancements, while diminishing as a plateau with increased frequency. Results of the experiments with aluminum and graphite-epoxy materials containing various defects are presented below. In addition, results of finite element analysis and optimization of signal processing techniques for noisy signals are presented in the attached slides. These new handheld eddy current devices were easy-to-use. They revealed superior detection capabilities including greater penetration depth with clear images of hidden defects such as holes, slots, dents, and material areas removed (by intense heat or corrosion). The exemplary eddy current system combines with Metglas-foil marker and optimal mathematical processing of noisy signals produced 30-to-50 times improvement over traditional single eddy current probes, and thus superior to commercially available scanners, enabling unusually sharp and clear images of scans over "noisy" graphite fiber—epoxy panels.

Continuous wave (CW) and pulsed eddy current techniques are described to characterize structural materials. The range of metallic and composite materials used in aircraft industry includes ferromagnetic and nonferromagnetic, isotropic and anisotropic solids containing conductive and dielectric elements. These materials, when excited by steady-state, sinusoidal signals, respond according to Maxwell's equations:

$$\nabla \times E = -j\omega\mu H, \quad (1)$$

$$\text{and } \nabla \times H = j\omega\varepsilon E + \sigma E, \quad (2)$$

where the variables E and H phasor vectors representing the electric and magnetic field strengths, respectively, μ is the material magnetic permeability assumed to be equal to the free space magnetic permeability, ε and σ are the permittivity and conductivity tensors of the material, and ω is the angular frequency ($2\pi f$) of the excitation source.

The permittivity and conductivity tensors in eqn. (2) are functions of the excitation frequency because of dielectric polarization phenomena associated with insulating portions of the structures under analysis. The interaction of eddy current signals and anisotropic materials having conductive and dielectric components includes contributions from each component. The conductivity of several structural materials is given in FIG. 16 as Table 1 1610 for Conductivity of Structural Materials. Propagation of eddy currents is determined by following constant as:

$$\gamma = \pm\alpha + j\beta = j\omega\mu(\sigma + j\omega\varepsilon), \quad (3)$$

where $\alpha$ and $\beta$ are the attenuation and phase constants, respectively. For good conductors, $$\delta = 1/(2\alpha), \quad (4)$$

where $\delta$ is the characteristic skin depth of the conductor given by:

$$\delta = \frac{1}{\sqrt{\pi f \mu \sigma}}. \quad (5)$$

The skin depth is defined from the attenuation of a uniform plane wave penetrating a flat semi-infinite conductor. For any other geometry or in the case where the excitation source is not time-harmonic, the calculated skin depth is only an approximation. The depth of penetration is 4.14 mm for aluminum 7075-T6 alloy with a conductivity of $2.32 \cdot 10^7$ S/m, a magnetic permeability of $4\pi \cdot 10^{-7}$ H/m and an excitation frequency of 2 kHz. For a graphite epoxy composite material with anisotropic conductivity, the depth of penetration is only an approximation. In the case of a graphite epoxy composite material with conductivity perpendicular to the fibers of 900 S/m and an excitation frequency of 2 MHz, the depth of penetration is approximately 21 mm. Features as deep as three-or-more penetration depths can be resolved using various eddy current techniques.

In order to describe the macroscopic eddy current characteristics of the anisotropic sensor material, the complex permittivity tensor should be defined. In general, a test probe (inductor coil) may be characterized by its resistance R in ohms (Ω) and by its inductive reactance $X_L = 2\pi f L$ in ohms (Ω), where f is the excitation frequency in hertz (Hz), and L is the probe's magnetic inductance in henrys (H). In the case of pulsed excitation, the eddy current problem can be defined by Maxwell's equations as:

$$\nabla \times H = \frac{\partial(\varepsilon E)}{\partial t} \quad (6)$$

$$\nabla \times E = -\frac{\partial B}{\partial t} \quad (7)$$

where H is the magnetic field strength, E is the vector electric field and B is the vector magnetic induction.

The response of an eddy current instrument can be monitored as an impedance plane trajectory as shown in view 100 of FIG. 1. The reactance $X_L$ is plotted as the ordinate and the resistance R is plotted as the abscissa in the impedance plane, where the probe impedance Z in ohms is given by:

$$Z = \sqrt{R^2 + X_L^2}. \quad (8)$$

In the absence of conductive material, the test probe has an impedance with coordinates $X_{L0}$ and $R_0$, the so-called air point $P_0$. When the probe coil is placed in the vicinity of a material sample, the impedance of the coil is modified to $X_{L1}$ and $R_1$, at point $P_1$. The magnitude and direction of the displacement of the apparent impedance from $P_0$ to $P_1$ are functions of the instrumentation used to monitor the change.

The impedance trajectory also changes with lift-off of the probe from the material under test. The distance from the air-point to the point on the impedance plane corresponding to the coil over the material under test depends on the effective conductivity of the material.

For graphite epoxy composite materials, the distance is less than that of more conductive materials such as titanium and aluminum alloys. Increased sensitivity can be achieved by increasing the frequency of the excitation signal. For this reason, most eddy current systems developed to inspect graphite epoxy composite materials use excitation frequencies in the 1 MHz to 10 MHz range. For an eddy current probe being used to scan over a structure containing features used for assembly such as holes 1470 in the subsurface region, a characteristic impedance plane trajectory can be observed.

In detection of subsurface features, the depth of the feature affects the direction of the impedance plane trajectory while the size of the subsurface feature affects the amplitude. The detection process becomes more complicated as a result of interferences stemming from probe location and lift-off as well as from multiple-layer effects. One benefit of the digital eddy current instrument is that multiple frequencies as well as pulse or non-sinusoidal waveforms can be used to advantage in eliminating the effects of interference resulting from multiple layer structures. Multiple frequency signal mixing can be used to improve signal-to-noise ratio in the evaluation of material thickness and in defect detection by subtracting the effects of interfering features.

Eddy current probes are typically used in two modes, pulsed and continuous wave. Based on the geometrical configuration, eddy current probes can be divided into two categories: axisymmetric and non-axisymmetric. Typically, axisymmetric probes consist of one coil (an absolute probe) or two coaxially wound coils, one of which is a driving coil and the other is a receiving coil (reflection probe). Non-axisymmetric probes are typically probes with cross-axis coils with axes of driving and pickup coils perpendicular to each other. A marking device should be incorporated to act in concert with an eddy current probe for identifying the center of a subsurface feature. For an axisymmetric probe, one can readily integrate a marking device such as a punch or a drill bit. The probe symmetry governs the axis of the marking device 270 to be aligned with the coil's axis. For non-axisymmetric probes, the incorporation of a marker 270 is a more difficult design problem due to the relative position of the axes of driving and pickup coils 130.

One of the major problems precluding successful implementation of an eddy current probe for detection of hidden holes and marking hole centers is related to maxima and minima in the eddy current signal produced when scanning over a hole or a slot. These "M-shaped" or "W-shaped" scan curves constitute a problem in the development of simple algorithms to find the location of the center point of subsurface features, called the null point by eddy current instrument manufacturers.

Scans using conventional eddy current probes produce M-shaped curves with hole center in the middle of the M-shaped curve, and thus with no clear maximum or minimum corresponding to the hole center. A theoretical model was developed to predict the eddy current waveform when scanning over a hole or a slot. This model is based on the assumption that the shape of the eddy current scan depends upon the magnetic fields of the driving coil and pickup coil over the substrate having discontinuities at the edges of the subsurface slot or hole. The scan curves represent interruption of the magnetic field by the slot or hole during the scan.

View 400 in FIG. 4 illustrates the W-shaped or M-shaped curves. Scans of a single eddy current probe over 3.5 mm wide slot 430 at different driving frequencies. Eddy current probe had a driving coil with inner diameter of 2.98 mm and outer diameter of 5.52 mm. The pick-up coil 130 has inner diameter of 5.52 mm and outer diameter of 6.48 mm. The curves in view 400 exhibit two minima for slots and several minima for holes. For a subsurface hole the maxima or minima occurred as the edges of the probe passed over the hole edges (across a given chord).

The scan becomes even more complicated with superposition of noise (such as a fiber graphite-epoxy panel placed on top of a metal plate with a hole). This increased the uncertainty and errors in detecting the location of the hole edges. The distance between the two minima is approximately the same as the diameter of the driving coil at an intermediate frequency around 500 Hz. Finite element analysis performed using the EMAS computer program revealed that at this intermediate driving frequency, the eddy current-imposed magnetic flux density reaches a maximum in a toroidal zone at the boundaries of the driving coil over the inspected material.

A marking device 270 was developed for the RS036-2 probe. A drill bit was inserted in the through hole of the eddy current probe. The diameter of the drill bit was 2.87 mm, having a clearance of 0.19 mm between the drill and Ledloy probe core. This permitted insertion and removal of the drill and to mark the surface of the aluminum plate. The addition of the drill also increased the amplitude of the pickup coil voltage and thereby improved the probe response. In a series of tests, the drill was wrapped in high permeability Metglass foil and then inserted into the RS036-2 eddy current probe. The foil-wrapped drill bit as the marking device 270 further increased the pickup coil voltage.

Computations involving finite element analysis were coupled with volume integral analysis. This computation revealed that for the probe moving over an 8.0 mm diameter hole, the distance between the two minima was 11.8 mm. Also, impedance curves at 500 Hz for the probe showed two minima located 11.2 mm apart. Impedance curves for the same probe scanned over a 2 mm diameter hole showed the distance between the two minima as 10.2 mm. Therefore, the distance between the minima is not necessarily represents the hole diameter. The finite element analysis indicated that the toroidal eddy current zone is narrower for higher frequencies and wider for lower frequencies. For a driving frequency between 60 Hz and 200 Hz, the average radius of the toroidal zone was approximately 1.3 times the radius of the driving coil. For driving frequencies from 700 Hz to 2000 Hz, the average radius of the toroidal zone is about 0.7 times the radius of the driving coil.

Additional computations using EMAS software showed that air core probes produce wider toroidal zones of eddy current as compared to probes with ferrite cup shield. These findings related to the size of the toroidal zone were added to the simplified model in FIG. 4 as dashed lines, which show the range of variations in the distance between the two minima. The depth of the two minima is also a function of the driving frequency. Ferrite cup-core eddy current probes operated at low frequency interacted with deeper subsurface features of the material under test, whereas air core probes operated at higher frequencies produced shallow eddy currents in the test object. These predictions from the combined finite element-volume integral approach with experiments involving a standard single eddy current probe and a subsurface hole in aluminum plate.

View 500 in FIG. 5 shows scan curves from these computations for full and half-size Probes. View 600 in FIG. 6 shows similar curves obtained experimentally, with eddy current probe RS036-2 incorporating a drill bit marker for a 7.0 mm hole via scans over 3.18 mm-thick aluminum alloy 7075-T6. Variables in the experiments included driving frequency from 100 Hz to 2000 Hz, thickness of upper layer of aluminum alloy either 6.4 mm or 3.2 mm, and diameter of the subsurface hole (15 mm, 8.3 mm, 7 mm or 3.9 mm). In all cases, a good agreement was observed between experimental and predicted performance. The combined finite element-volume integral approach helped us to better understand the effects of reducing probe diameter on subsurface feature detection in view 500.

In the calculations, driving frequency was 200 Hz, 500 Hz and 1000 Hz, and the hole diameter was 2 mm and 8 mm. A full-size and a half-size version of the RS036-2 probe were modeled for view 500. Both models have incorporated a drill bit as the marking and field focusing element. The full size probe contained a driving coil with 8.9 mm diameter, 2.54 mm width and 8.64 mm height. In the smaller version of the eddy current probe, each of the linear dimensions were one-half that of the full-size probe. Computations involved scans over the center of subsurface holes and included the effects of lift-off up to 10 mm.

Results of the simulations have confirmed the existence of multiple minima in the scan of subsurface holes for both full and half-size probes. In addition, the half-size probe showed the third minimum located exactly on the center of the hole. The third minimum can be due to the focusing effect from the drill bit. However, the third minimum is not deep enough to serve as a reliable criterion to locate the center of the hole. Experimental studies on the detection of a 7 mm diameter hole overlaid by 3.18 mm thick aluminum alloy also confirmed the existence of W-shaped curves with two minima in the scans of view 600.

The shape of the waveform is independent of the thickness of the top layer. Results obtained from the exemplary simplified model (overlapping solution), from the finite element and volume integral modeling and the experiments consistently revealed the same type of scan curves with two minima and with no reliable central feature to enable precise positioning of the surface hole. Analysis of the distance between the at least two minima indicated that such criteria would result in uncertainties and errors in the location of the centers. These errors are on the order of millimeters rather than the desired accuracy of tenths of a millimeter. This led to the conclusion that improved positional accuracy can be achieved by redesigning a single eddy current probe to a configuration that instead of W-shaped scans produce U- and V-shaped scans. This requires a configuration producing parabolic (instead of toroidal) magnetic field distribution.

Several new design approaches were considered, including the use of a marking device 270 acting as a focusing element. In another design approach, two and three closely positioned eddy current probes 290 were employed. In the first design approach for device 210, work was performed to investigate ways to strengthen and concentrate the field produced directly below the tip of the marking and focusing device. The possibility of merging the two toroidal zones into a paraboloid of rotation was investigated through a finite element modeling approach using EMAS software.

In particular, the inner Ledloy wall of the probe was removed so that the drill bit was separated from the driving coil by a layer of air. The results of these simulations for a 300 Hz driving frequency, indicated enhanced focusing of the magnetic flux density, but no qualitative change in the shape of eddy current zone occurred. Unfortunately, conduction current density in the probe with removed inner steel wall appeared to be approximately two times weaker than that in the probe with inner steel wall. These computation and experimental results suggested that the problem of W-shaped scans is inherent in axisymmetric single-probe designs, and this problem cannot be overcome via enhancement of focusing or modifications of the inner wall configuration.

The use of a multiple-probe design for locating a subsurface hole's center with coils driven out-of-phase for two probes and shifted by 120° for three-probe design appeared to be more promising. The use of three-probe and two-probe designs eliminates the necessity of analyzing scan curves with multiple minima or multiple maxima. A balanced eddy current signal is received when there is either no hole or when the probes are located at the same distance from the center of the hole. A change in the distance between the probes and a tilt of the probes can be used as an additional means of achieving better images of hidden features depending on the size and depth of the feature.

When the two probes are driven with the same amplitude and phase, the two neighboring eddy current zones overlap thereby canceling each other. In contrast, probes driven out-of-phase will produce overlapping eddy current zones as a sum of eddy currents, favorably interacting with the hole located between the two probes 290, View 800 in FIG. 8 illustrates the effects of cancellation and summation as a function of the phase shift (0° and 180°) and the distance between the two probes 290. The diamond lines 870 correspond to the eddy current density along the top surface of the third alloy layer 1440 containing a hole 1470. The square lines 880 are the same for the second probe. The triangle lines 890 the sum of the two eddy current distributions. The curves corresponding to the first and second probes are similar to that of scans having multiple minima or maxima with a "null" point in the center characterized by cancellation of eddy currents.

The effect of phase shift and distance between probes on the superposition of eddy current cancellation is shown in FIG. 8 as view 800. Reduction of eddy current density occurs when the two closely located probes are driven with the same amplitude and phase in plot 810. Desirable summation of eddy currents induced by the two probes occurs when these are driven out-of-phase. Plots 820 and 830 present a sequence of events when probes driven out of phase are located either 8.0 mm from plot 820, 6.0 mm from plot 830. As can be seen from the charts, plot 840 is the most desirable scenario for enhancement of eddy current above the hole. This configuration suggests that the coils should be placed as close to each other as possible and were driven with 180° phase shift. In these embodiments, the probes can be tilted with respect to their vertical axis, to better merge eddy currents near smaller subsurface holes. The marking/focusing devices can be positioned closer or further away from the test surface.

These efforts included evaluation of several digital signal-processing methods to reduce the effect of noise in the eddy current signal. Under sinusoidal excitation, the eddy current signal is generally distorted and contains noise. This problem is even more severe in composite materials in which the eddy current is much smaller due to the lower conductivity of composite materials. Graphite-epoxy materials are three orders of magnitude less conductive than aluminum alloys, as shown in Table 1 1610. After an extensive study, two signal-processing techniques were determined to be suitable for use in eqn. (1) low noise/large signal condition such as aluminum-on-aluminum, and eqn. (2) large noise/small signal condition such as graphite composite-on-aluminum or a when a graphite composite is overlaid by another graphite composite layer. A digital summation technique was observed to be adequate for use in the first condition in which the noise is low and the signal is large, while a cross-correlation technique is suitable for use in the second condition with large noise and small signal. Each of these techniques is described separately as follows.

A digital summation technique was developed and implemented to provide noise reduction in the situation where the noise level is low-to-modest. This technique is suitable for use in detection of subsurface holes in aluminum-on-aluminum structures. This summation technique was easy to implement and it presented a very low computational load. This signal processing technique samples and sums the amplitude of the pickup coil voltage every 10 psec. The sum is then averaged over the total sampling time. The average of the sum decreases when the probe is over a subsurface fabricated hole. The technique was tested at 200 Hz, 500 Hz and 1000 Hz on an aluminum fixture composed of a 6.35 mm plate of aluminum over a second aluminum plate containing slots and holes. The discrete amplitude averaging was able to detect subsurface slots to within 0.127 mm in 0.5 seconds. The discrete averaging algorithm was coded in LabView and placed in the computerized data processing system. The signal averaging technique showed a well-defined minimum as the probe passed over the center of a subsurface slot.

Work was also performed to characterize the system noise level as a function of increasing number of sample points. A LABVIEW program was developed to automate the data acquisition procedure and to provide a user interface. The LABVIEW coded program simulates the hardware implementation of summing N points shown in the following equation:

$$V_{ave} = \frac{\sum_{i=1}^{N} |V_i|}{N}, \tag{9}$$

where $V_i$ is the instantaneous probe voltage at the sample time of the analog-to-digital converter and $V_{ave}$ is the average value of the noisy sinusoidal probe voltage.

In order to calculate the noise with high confidence, $V_{ave}$ is collected forty times sequentially with identical conditions, and the root-mean-square (RMS) noise of the system is calculated as follows [for forty points]:

$$V_{RMS}(\text{noise}) = \frac{1.253}{G} \cdot \frac{\sum_{l=1}^{40} \left| V_{ave} - \frac{\sum_{1}^{40} V_{ave}}{40} \right|}{40}, \tag{10}$$

where G is the gain of the amplifier shown in FIG. 7 as view 700. The gain is varied for different probes to provide optimal signal levels to the analog-to-digital converter.

Test results of the system noise level as a function of the number of data points are graphically represented in view 700, which shows that the general trend of system noise corresponds well with the theoretical prediction of:

$$V_{RMS}(\text{noise}) \propto \frac{1}{\sqrt{N}}, \tag{11}$$

that is graphed as a dash line. The system noise, if uncorrelated and distributed in a Gaussian fashion, is calculated as follows:

$$V_{sys}(\text{noise})=(V_1\text{noise})^2+(V_2\text{noise})^2+(V_3\text{noise})^2+\ldots, \tag{12}$$

where the various sources of noise in the system are represented by the terms containing $V_1$, $V_2$ and so forth. This pertains to the continuous portion of the system and not the sampled portion. In other words, eqn. (11) is for the noise sources before the A/D converters 1240. Prior measurements indicate that the probe is much noisier than any other part of the analog circuit and, therefore, dominates the system noise calculation from eqn. (12). As the number of samples N increases the noise asymptotically approaches a minimum of 10 μV. The asymptotic level of noise is related to the analog-to-digital converter characteristics such as aperture jitter, quantization error, integral linearity error and transition noise.

Probes RS036-2 and RS036-3 over two layers of aluminum. Cross-correlation techniques were also used to obtain an accurate determination of amplitude change and phase shift of the eddy current signal. Given two complex-valued functions $f(t)$ and $g(t)$, the cross-correlation function $R_{fg}(\tau)$ of the functions is defined as:

$$R_{fg}(\tau) = f(t) \otimes g(t) = \int_{-\infty}^{\infty} f(\tau)g(t+\tau)dt, \tag{13}$$

where symbol ⊖ denotes correlation, t is time, τ is the time delay. The cross-correlation function attains its maximum value when the time delay of the eddy current signal was offset to be in phase with the driving function. In this way, the phase delay is calculated. The amplitude of the eddy current signal can also be calculated from the cross-correlation function by examining the maximum of the correlation function.

The discrete form of the cross-correlation function was mathematically solved to extract the amplitude and phase of the pickup coil signal in an eddy current instrument. Then cross correlation $R_{xy}(\tau)$ gives the definition of cross correlation for two finite length periodic functions of time series width $T_s$ (sec) as:

$$R_{xy}(\tau) = \int_{-T_s}^{T_s} u(t)A\sin(vt)u(t+u)B\sin(\omega t + \phi + \omega\tau)dt, \tag{14}$$

where in eqn. (14): x=A sin(ωt) is excitation coil voltage (V), y=B sin(ωt) is pickup coil voltage (V), τ is time shift variable (sec), $T_s$ is width of x and y, ω=2πf is frequency, f=1/7 is excitation frequency (Hz), T is period of excitation, φ is phase angle between the excitation and the pickup signals (radians), and unit function u(t) has two contingent values:

$$u(t) = \begin{cases} 1 & \text{for}|t| \leq T_s/2 \\ 0 & \text{for}|t| > T_s/2 \end{cases} \tag{15}$$

The unit function u(t) limits the width of the excitation and pickup signals undergoing cross correlation. Also, eqns. (16) and (17) represent the solution for eqn. (15) for a periodic function width $T_s$ that is an integer multiple of the excitation period T, such that:

$$R_{xy}(\tau) = \frac{(\tau + T_s)AB}{2}[\cos(\omega\tau + \phi)] \quad \text{for} -T_s < t < 0, \tag{16}$$

and $$R_{xy}(\tau) = \frac{(-\tau + T_s)AB}{2}[\cos(\omega\tau + \phi)] \quad \text{for } 0 < t < T_s. \tag{17}$$

The goal of the signal processing is to extract the pickup coil signal amplitude B and the phase angle φ from the cross correlation function described by eqns. (16) and (17).

The digital eddy current instrument requires a discrete form of eqns. (16) and (17). In the discrete form, the time shift continuous variable r is replaced by a digital sample number n as:

$$n=\tau f_s, \tag{18}$$

where $f_s$ is digital sampling frequency (Hz). The width of the periodic signals considered for cross correlation is defined in terms of the number of equally spaced digital samples N in the width of the excitation and pickup signals as:

$$N=T_s f_s. \tag{19}$$

As such, eqns. (20) and (21) are the resultant discrete forms of the cross-correlation function. The cross correlation function contains twice as many digital samples, 2N, as there are digital samples in the width of the input periodic functions as:

$$R_{xy}(n) = \frac{ABn}{2}\left[\cos\left(2n\pi\left[\frac{f}{f_s}\right]+\phi\right)\right] \quad \text{for } 0 < n < N, \tag{20}$$

and $$R_{xy}(\tau) = \frac{AB(2N-n)}{2}\left[\cos\left(2n\pi\left[\frac{f}{f_s}\right]+\phi\right)\right] \quad \text{for } N < n < 2N. \tag{21}$$

View 1300 in FIG. 13 shows the cross-correlation function for two periodic functions as described in the caption. The zero shift point is at n equal to 100 and the location of the peak value to the right of the zero shift point indicates the negative phase angle. The cross-correlation function is zero valued at the end points (n=0 and n=2N). The remaining nineteen zero values are due to the cosine function in eqns. (20) and (21), but they rarely occur at a digital sampling point.

A linear interpolation "zero crossing" algorithm was developed to predict the fractional values of n where the cross-correlation function is equal to zero as $n_0$. These points are useful in determining phase φ, because the argument of the cosine must be equal to $$\frac{\pi}{2}(1+2N_0).$$

Further, $N_0$ is the integer number of zero crossings as:

$$n_0=0,1,2,\ldots,N_0. \tag{22}$$

An algorithm employing the zero-crossing predictions $n_0$ was developed to extract the phase $\phi$ from the argument of the cosine functions and is described as:

$$\phi = \frac{\pi}{2}\left(1 + 2N_0 - 4n_0\left[\frac{f}{f_s}\right]\right). \quad (23)$$

This knowledge of $\phi$ by eqn. (23) facilitated a solution of eqns. (20) and (21) for the amplitude of the pickup coil signal as delineated in eqns. (23) and (24) as:

$$B(n) = \frac{2R_{xy}(n)}{An\cos\left(2n\pi\left[\frac{f}{f_s}\right] + \phi\right)}, \quad 0 \le n \le N, \quad (24)$$

and $$B(n) = \frac{2R_{xy}(n)}{A(2N-n)\cos\left(2n\pi\left[\frac{f}{f_s}\right] + \phi\right)}, \quad N \le n \le 2N. \quad (25)$$

Preliminary solutions of eqns. (23), (24) and (25) indicated accurate extraction of B and $\phi$ were possible when periodic functions with widths of five periods or greater were employed to calculate the cross-correlation function. The improvement in the signal-to-noise ratio with the new probe complements the signal-processing algorithm by reducing the noise content. Tests of the cross-correlation algorithm showed that it is more powerful than signal averaging in removing noise from the pickup coil voltage waveform. Cross-correlation of the excitation and pickup coil voltages resulted in a noise-free cross-correlation function.

Table II 1620 in FIG. 16 summarizes the effectiveness of the signal averaging and cross-correlation algorithms. Both techniques were successful in identifying the subsurface features necessary for this program. In view 1000, FIG. 10 shows a Cross Correlation Function for two finite-width periodic functions described in eqn. (1): A=500 V, B=5 V, f=500 Hz, $f_s$=10 kHz, $\phi$=−43.6417°, $T_s$=5 T, and N=100.

The exemplary mechanical system for position identification and marking on composite & metallic materials involved evaluation criteria that included the instrument accuracy and reliability, ease of use, ease of subsequent drilling operations and power consumption. As described, FIG. 2 shows an elevation view 200 of a first embodiment of the exemplary eddy current scanner 210. The prototype probe 210 includes a plastic housing 220 that encloses the excitation board 225 and the probes 290. The display panel 245 and the actuator marking button 280 are visible on the top surface of the housing 220. The battery 230 and the A/D converter board 240 attach to the excitation board 225. The display board 245 is mounted on the top of the enclosure 220 and holds the signal strength indicators 250. The electric motor 260 drives the marking device 270 through the transmission 265. The actuator button 280 controls the electric motor 260 and forces the marking device 270 into the panel 1420.

The first exemplary design approach was based on a hardened steel punch located in a guide centered between the probes. The operator placed a spring-loaded pencil-type actuator into the receptacle of the punch and depressed the actuator to strike the punch and indent the panel. Experiments showed that this marking device left an accurate indentation on the surface of a 3 mm thick 2024-T3 aluminum panel. The indentation was 80 µm in diameter and 350 µm deep, which is considered sufficient to position a drill bit and make a rivet hole. The use of the marking device was shown to cause no disturbance to the signal balance between the probes or to the accuracy of location of subsurface features.

The second design approach attempted to increase the ease of use by eliminating the external actuator and incorporating an internal spring-driven striker. In this device, a custom-made hammer device was affixed above the hardened punch and an actuator was mounted to strike the hammer and transfer its impact energy to the punch. The actuator was cocked by the operator prior to the scan of the panel and upon locating the center of the subsurface hole, a button was depressed releasing the actuator striking the panel and leaving an indentation. The device left an indentation in the 3.0 mm thick 2024-T3 aluminum panel of the same dimensions (80 µm diameter, 350 µm deep) as the first method. Unfortunately, this configuration disrupted the balance between the probes and negatively impacted the accuracy of subsequent hole locations. Additionally, the ability to quickly locate a series of holes was hindered by the requirement of rearming the actuator before marking each center.

The third design approach is under development and utilizes an electric motor 260 to rotate a sharpened marking device 270 cutting a shallow recess into the panel 1420 in FIG. 3 of view 300. In this configuration, the operator depresses the actuator button 280, an electric motor 260 rotates the marking device 270 while the actuator button 280 forces the cutter into the panel 1240.

This device 310 has the potential to provide location marks and recesses to locate the drill for subsequent assembly in both aluminum and composite panels thereby avoiding fracturing due to impact typical for the first two design approaches. Initial results with this device produced recesses 100 µm in diameter and 250 µm deep in a 2024-T3 aluminum panel 1420, with no effect on the accuracy of subsequent hole locations. Efforts are on-going to provide a balance between the power consumed by the motor during the marking procedure and the time required to produce a sufficient mark. Tests are also being conducted to evaluate the effectiveness of this marking system on composite panels.

The fourth design approach to marking the location of subsurface features is an ink jet. In this configuration, a capillary is placed between the probes to deliver a small drop of quick drying ink to the panel surface. This system has low power consumption and no effect on subsequent location accuracy. The ease of use in the initial marking of the hole is countered by the difficulty in locating subsequent drilling operations in the center of the ink mark.

This work also included design and integration of an eddy current instrument, progressed through design, fabrication and integration of the third-generation all-digital-eddy-current (ADEC) handheld instrument. Major accomplishments in this objective include significantly reduced size, weight and power consumption of the ADEC instrument, and integration of various components into a compact handheld instrument.

The third-generation system is shown in a block diagram form in FIG. 11 as view 1100 as the schematic of the third-generation digital eddy current instrument. The third-generation design was divided into five modules:
 1) probe excitation and pickup coil amplification,
 2) analog-to-digital conversion, 3) signal processing,
4) display, and
5) power supply.

The third-generation system uses a modular design implemented on individual circuit boards to allow interchangeability and upgrades (algorithms, etc.) with future modules. Furthermore, modularity was determined to allow the stacking of boards and the full use of space inside the final package. Design emphasis was placed on low power consumption and miniaturized packaging without sacrificing functionality and sensitivity of the instrument. The component count and power consumption are expected to be reduced to half of the second-generation design. Where applicable, CMOS devices were chosen for low power consumption and availability in small packages.

The probe excitation and pickup coil amplification module proceeds in the area of excitation for the driver coil of the eddy current probe. The probe excitation is a single frequency sine wave. After a comprehensive study, it was decided to use a crystal-based square wave generator and to remove the odd harmonics by filtering to achieve a sinusoidal waveform. Identification of a signal generator integrated circuit (IC) showed the second-generation device EPSON SPG8651B to be an appropriate square wave generator. Three classes of filters were then considered:
1) switched-capacitor IC filters that operate in discrete time and may produce aliasing problems,
2) continuous-time IC filters that do not meet the strict power and space requirements needed for a hand-held instrument, and
3) a discrete component filter design that may take the form of either resistance-capacitor (RC) networks and op-amps or inductor-capacitance (LC) resonators.

After a tradeoff study of system stability, power requirements, and component count considerations, it was decided to proceed with a discrete component filter design. An active filter known as a Sallen-Key topology was chosen to implement a fourth-order Chebyshev low-pass filter. Measurements of the prototype output stability and filter performance compared favorably to SPICE simulations previously performed during the design process. The gain at 500 Hz was measured as 12.4 dB and the odd harmonics at 1500 Hz were measured as −36.9 dB, indicating close to 50 dB suppression of the side bands. Concurrent experimental efforts use the probe excitation module to drive the eddy current probes. The layout of the printed circuit board for the analog-to-digital conversion module was completed during this reporting period. The module is designed with surface mount components with compact chip layout.

The A/D conversion module design effort succeeded in finding an improved 16-bit converter device with similar electrical performance to that used in the second-generation system. Work was completed on the design, fabrication and integration of the ADC module. The output of the analog-to-digital converter is connected to a computer through the 10 Tech Wavebook Model 516 for data acquisition. A LabView program was written to enable quick evaluation of the converter board and tests were conducted to validate the prototype circuit. The new analog-to-digital converter (Linear Technology Part Number LTC1605-2) is smaller, consumes less power and is less expensive.

Progress on the signal-processing module continues by implementing the novel averaging technique in electronic hardware. Using SPICE simulation, the design is being divided into subsystems and selection of digital devices. The 16-bit analog-to-digital converter module produces binary data that are summed in the signal-processing module. This is a powerful noise reduction technique that improves the signal-to-noise ratio (SNR) proportional to the square root of the number of summations shown in FIG. 7 in view 700. The limitation on the number of summations is the amount of hardware required to contain the ever-larger sum and the length of time the operator can wait for the updated sum. The design of a novel BCD adder circuit was 90% completed and will next be simulated using circuit simulation software.

Two display technologies were considered: bar graphs and seven-segment displays. The conventional approach is to convert BCD (binary coded decimal) data to seven-segments using readily available components. However, the system signal-processing module produces binary data, and uses a conventional approach that requires a binary-to-BCD converter device for each bit of the binary word. This word may contain from 16-to-32 bits, thus making the converters unduly complex. Another approach is to use a microprocessor to implement an assembly language-coded routine for the conversion process. Thirdly, a lookup table burned into a ROM device was considered. This approach appears to require a low part count and is low cost. Programmable array logic (PAL) is another technology under consideration. Work performed to optimize the characteristics indicated that the search for a display most amenable to the handheld design requires further study. A seven-segment display format was found to simplify data conversion from the BCD adder to the format of the readout. However, a survey of instrument operators revealed that the display may be most effectively read in the bar graph format. Design work progressed for conversion of binary data from the digital summation circuit to the bar graph display.

Investigation of the power supply module included three battery types as part of the power supply design. These included non-rechargeable lithium, rechargeable lithium-ion and nickel metal hydride (NiMH) batteries. Evaluation criteria for the battery include the system power requirement tradeoffs, availability of the battery and battery charger, rechargeability and energy density. A decision was made to implement a NiMH battery as the power source because of its availability and higher volume charge density than nickel-cadmium rechargeable batteries. Further information was gathered for power supply components with emphasis on efficient conversion techniques such as charge pump and boost converter topologies. The status of each of the electronic modules is summarized in Table III 1630.

An ADEC instrument was used to characterize the subsurface features in an Al7075-T6 aluminum alloy sample having a 3.18 mm or a 6.35 mm top layer. Work began by using a single probe to characterize a subsurface hole feature to determine the optimal driving voltage, frequency and amplification requirements. Subsequently, an innovative dual-probe configuration was developed to locate the center of subsurface features. The MATLAB software was modified to normalize the data, thus allowing easy comparison of the many sets of data produced during this reporting period. ORIGIN graphing software was used to display and analyze these data. A procedure was developed to enable the aluminum panels to be scanned repeatably and precisely. This is necessary to allow accurate comparisons among scans made using different probe configurations and varying electronics.

FIG. 10 in view 1000 shows the system response to a 3.5 mm slot in the layer beneath the 6.35 mm aluminum top surface when excited in a frequency range 200 Hz to 600 Hz. The trough at 26 mm from the origin represents the signal strength at the center of the slot. The data were gathered at 1 mm intervals, and 4,096 points were averaged at each location on the plot. The results indicated that a lower driving frequency is superior in detecting the slot for this geometry. Experiments were performed with various hole sizes, and FIG. 13 in view 1300 shows the typical waveshapes resulting as a function of distance from the center of the hole for different frequency scans. The measured minimum is most evident in the 150 Hz to 600 Hz range. Experimental studies on holes below a 3.18 mm thick aluminum alloy skin layer also confirmed the existence of local multiple minima in the scan as summarized earlier in FIG. 6 as view 600, which also confirms that the W-shaped waveform is independent of top layer thickness. The added complexity of the waveform prohibited the use of a simple algorithm to locate the center of a hole. To solve this problem, a multiple probe eddy current instrument was designed. The hole center can be located when the eddy current signals from the probes are equalized.

Three-layer sandwiches were tested as a sample in view 1400. The aluminum plates were 6.35 mm (0.25") thick and fiber-graphite composite plates were 3.175 mm (0.125") thick. The aluminum and composite plates were in direct contact or had a gap of 0.5 mm to 1.0 mm between the plates. The bottom plates had holes (1 mm to 15 mm in diameter), slots (5 mm deep, 5 mm wide), indentations, and scraped areas to represent corrosion. In several experiments, a metal foil or a metal wire was disposed between two graphite-epoxy plates. Variables included lift-off distance of the eddy current probe, size of the gap between plates, probe diameter, and excitation frequency. Commercially available current probes with coil diameters of 12.7 mm and 25.4 mm were employed. The driving frequency for these probes was between 60 Hz and 2000 Hz.

FIG. 14. Test samples with an external plate or layer 1420, aluminum or composite plate 1430, aluminum or composite plate with holes, gaps and removed areas 1440, and a mount 1450 to hold the plates together. This determined that existing eddy current probes can be successfully used to detect various hidden features in aluminum-aluminum, composite-aluminum and composite-composite sandwiches. A drill bit or an ink pen as a marker 270 was used to mark locations of the subsurface features.

Conductivity, Driving Frequency and Penetration Depth Considerations. According to the initial estimates for the 7075-T6 aluminum alloy with conductivity $2.32 \cdot 10^7$ S/m and excitation frequency 2 kHz, the penetration depth should be approximately 4 mm. Graphite fiber-epoxy composites have anisotropic conductivity of 200-to-900 S/m in the direction perpendicular to the fibers, and 20,000 S/m to 80,000 S/m in the direction parallel to the fibers. For a graphite epoxy composite with conductivity in the direction perpendicular to fibers (900 S/m) and an excitation frequency of 2 MHz, the penetration depth should be close to 21 mm. According to open literature, the driving frequency for graphite epoxy composites should be between 1 MHz and 10 MHz. This presented challenges: identifying the frequency in the broad range between 2 kHz and 10 MHz to be used for the aluminum-composite sandwiches, and whether fiber orientation a potential source of significant signal noise and uncertainties.

Tests using single eddy current probes involved performing several scans for the sample with the upper composite plate (3.175 mm or 0.125") on top of different aluminum plates containing defects: slots, holes and scraped areas. A scanning speed of 152 mm/min was used. These tests revealed the following: larger features were seen well, while smaller features (like small-diameter holes) looked blurred and were harder to identify. Embedded metal wire was detected under graphite epoxy plates. Smaller-diameter eddy current probes produced better images of these subsurface features. One of the preliminary scans using single eddy current scanner included images of holes, slots and removed areas in FIG. 15 as contour view 1500 for W- and M-shaped Scan Curves Produced by Single Eddy Current Probes. The root cause of the "fuzziness" of the images in the preliminary scans was related to the individual linear scans, i.e., single scans across slots and holes.

FIG. 4 illustrates scans using a single eddy current probe over an aluminum plate with a 3.5 mm wide slot. The driving coil inner has an inner diameter 2.98 mm and an outer diameter 5.52 mm. The pick-up coil has an inner diameter 5.52 mm and an outer diameter 6.48 mm. The slot width is shown as the width of the rectangle 430. As can be seen from view 400 for the single-probe scans over the slot, the distance between two minima in the scan curves is approximately the same as the diameter of the driving coil at 500 Hz. Lower driving frequencies, such as 100 Hz, produced wider W-shaped scan curves. Higher driving frequencies, such as 1000 Hz, produced narrower W-shaped scan curves. While the axes of symmetry of the two W-shaped curves coincide with the center of the slot, the W-shaped curves do not reveal the edges of the slot. This created uncertainties with determining the size of the slots (i.e., locations of its edges).

The results of additional studies on the influence of the driving frequency on the shapes and amplitude of the scan curves (peak-to-peak or maximum-to-minimum distance) are presented in FIG. 6 as plot view 600. The scans were performed for sandwiches made of two aluminum plates 1420 and 1440. The upper plate 1420 was a 3.18 mm thick 7075-T6 aluminum plate. The lower plate contained a 7 mm hole with diameter shown in FIG. 6 as the width of the dot-dash envelope 640. The strength of the pickup signal was analyzed as maximum-to-minimum distance in the W-shaped signals as dash lines 650. Lower driving frequencies (200 Hz to 500 Hz) produced deeper W-shaped scans with larger maximum-to-minimum pick up signals. Higher frequencies (2000 Hz) produce shallower M-shaped signals on pickup coil. There was a transition from the W-shaped curves with two minima for lower frequencies to M-shapes curves with two maxima for higher frequencies. The minima in the W-shaped scans are narrower for higher frequencies. As shown in the previous example in FIG. 4, the axes of symmetry of the curves correspond to the center of a hole or a slot. However the minima and maxima of the curves are not reliable indicators for the hole edges. The tilt of the W-shaped scans is especially strong for lower driving frequencies. The nature of this shift is not clear. Apparently this shift or drift may contribute to the noise level and uncertainties that can be minimized by using a range of driving frequencies between 500 Hz and 1500 Hz.

Theoretical Modeling: To better understand the interaction of the eddy currents with the hole edges, a finite element was performed using EMAS software. The modeling results reveled the following: zones of current density can be viewed as toroidal zones interacting with cavities, including holes. The depth and width of the toroidal zone depends on the driving frequency, size and position of the driving coil, and on the eddy current probe size. In order to insert a marker, one needs some space in the center of the eddy current probe; therefore, removal of the inner steel-led casing of the eddy current probe was decided. A series of finite element runs was performed to better understand the consequences of these design changes. In subsequent theoretical models, the influence of the focusing effect introduced by the marker was investigated, as well as the eddy current probe diameter. The analysis was performed for scans over the 7 mm, 8.3 mm, 13.9 mm and 15 mm holes. The upper aluminum plate 1420 used was 3.2 mm or 6.4 mm thick and the driving frequency was between 100 Hz and 2000 Hz.

FIG. 5 illustrates two scans—one made by a larger-diameter probe and another by a small-diameter probe. A stronger pick-up signal (minimum-to-maximum) was produced by the smaller probe. In addition, the half-size probe produced the third minimum located on the hole center, possibly due to the focusing effect of the drill bit. Unfortunately, the third minimum was not deep enough to serve as a reliable criterion to locate the hole center.

Additional Experiments: The next step considered possible ways to enhance the third (central) minimum shown in FIG. 5 to produce U-shaped and V-shaped scans yielding clearer images of the edges. This would be accomplished by crossing (scanning) the edges only once (apparently, crossing an edge with the toroidal zone created blur images where the positions of the edges were harder to locate). Several metal markers were tested including a 2.87 mm diameter steel drill bit. The drill bits were wrapped with Metglas foil in an attempt to enhance pick-up signal. Metglas is an amorphous alloy with unique ferromagnetic properties, and so can be magnetized and demagnetized quickly and effectively. The drill bit was inserted in the central hole of the eddy current probe and then the drill bit was turned to make small indentations to mark locations of the subsurface features.

As shown in FIG. 20 as graphical view 2000, for a driving frequency of 200 Hz, the pick-up signal increased fifty-fold times, from 0.1 2060 to 5.0 2030 for 200 Hz. This was a very significant improvement that influenced the next-step design configurations: FIG. 7 in graphical view 700 shows experimental data on voltage noise as a function of the number of samples. Voltage noise as a function of the number of samples in single eddy current probes from the sample 1410. To summarize, an ordinary digital summation of the voltage samples worked well for aluminum alloys; however this technique produced noisy data for graphite-epoxy plates. Cross correlation methods yielded smoother signals in both aluminum and graphite-epoxy composite plates. Finally, the least squares fit algorithm worked very well on the signals with very high noise levels.

FIG. 8 in plot view 800 illustrates the cancellation and summation of eddy currents depending on the phase shift (0° and 180°) in driving signals as well as on the distance between the two probes. The diamond line 870 refers to the first eddy current probe. It represents eddy current density along the top surface of the second layer 1430 containing a hole 1470. The square line 880 represents eddy current density for the second probe in the same scenario. These W-shaped and M-shaped (870 and 880) curves are similar to those discussed in previous sections of this disclosure.

FIG. 8 in plot views 800 for 0° shift and 6 mm distance show two eddy current probes moving over a hole in the lower plate. The triangle lines 890 are the sum (a product of linear superposition) of the two currents with deep single U-shaped minima in the middle. Cancellation or partial reduction of the eddy current density occurred when two closely positioned probes were driven with the same amplitude and the same phase. Little interaction was seen in the eddy currents produced by two probes positioned too far away from each other. A favorable summation of eddy currents occurred when the two probes were driven out-of-phase while the probes were 8 mm apart. Plot 840 represents the most desirable conditions for enhancing eddy currents.

The plots represent: upper left 0° shift and 6 mm distance 810; upper right 180° shift and 16 mm distance 820; lower left 180° shift and 8 mm distance 830; and lower right 180° shift and 6 mm distance 840. Influence of the phase shift and the distance between two probes on the superposition of pick-up signals diamond line 870 features eddy current density along the top surface of the second layer containing a hole for the left probe. Square line 880 features the same for the right probe, while the triangle line 890 shows their super-positions.

Experiments with Closely Disposed Probes. A series of experiments was designed and implemented to validate conceptual dual-probe designs for hand-held applications. Test samples included aluminum plates with holes in the lower plate. Samples included aluminum plates with a thickness of 3 mm in the upper layer. Diameters of holes in the lower layer of aluminum were 3 mm, 5 mm and 8 mm. Driven out-of-phase, two probes produced clearly identifiable peaks corresponding to hole centers. The accuracy of the location of the hole centers was evaluated with ability to repeat the results.

In these experiments, probes were moved over the surface of the upper plate. The signal peaks were detected, and a marking actuation was performed resulting in an indentation on the sheet of paper covering upper surface of the plate. In these tests, driving frequency was 500 Hz, and driving voltage amplitude was 1.8 V. The distance between the probes was approximately 2 mm. The number of data points used in the experiments was 16,000. The noise level was about four points for approximately 150-point signals.

As a result of these experiments, the final configuration of the handheld scanner suggested inclusion of driving frequency between 500 Hz and 1000 Hz, a readable display (including directional indicators and the number of data points taken), applied pressure, clearance between holder and probes, distance between the probes, spring-loading of probes, friction between probes and holder and between probe and surface of aluminum, balancing techniques providing equal out-of-phase driving signals, and other patent-pending features. Scans were performed semi-manually using Velmex x-y control driver with steps of 6.3 μm. The following criteria for making marks on the surface of the test sample were used:

(a) minimal sum of the two signals from pick-up probes and
(b) minimal difference between the two signals.

The first criteria corresponds to the condition of maximum loss of eddy current due to the presence of the volume of the hole, while the second criteria corresponds to the condition of symmetry of the two probes with respect to the center of the hole. In addition, the first criteria served as an indicator for x-direction, while second criteria as indicator for y-direction. Experiments showed that the centers of the 8 mm and 5 mm holes can be found with accuracy better than ±0.5 mm. The centers were marked and drilled with a ¹⁄₁₆" diameter drill bit. The match with the center of holes underneath was very satisfactory. The center of a 3 mm hole was harder to locate: only one out of five markings was successful.

The probe holder used in this experiment did not provide sufficiently accurate positions for the probes due to gaps between the holder and probes. Also, friction of the probe surfaces moving along the surface of the plate resulted in probes tilting, generating undesirable fluctuations in data. These were corrected by the fabrication of a new holder with a tighter fit for probes, as well as by adding a thin layer of low-friction material on the bottom surfaces of the probes. A subsequent series of tests involved fully manual scans.

A new holder with more tightly positioned probes was constructed from a polymeric material and tested. A spring-loaded mechanism was introduced to compress the probes against the surface of the test plates. The hole centers were determined to be easier when the probes were not spring-loaded. Distribution of the marks on the surface of the test plates showed accuracy: ±2 mm for 5 mm and 8 mm holes and a larger distribution of marks for 3 mm hole.

FIGS. 2 and 3 show the two-probe hand-held eddy current scanner and its block diagram. The next step was to develop a three-probe scanner with a drill bit located in the center of the three-probe assembly. The probes in this hand-held all-digital eddy current scanner were excited with a 120° phase shift. This scanner was used to detect hidden features in composite plates. Overall, it produced sharper images of the hidden holes, edges, slots, and removed areas. The three-probe scanner enabled faster location of the hole centers, because each probe was basically an indicator for the scan direction. The hole center corresponded to the scenario when the signal strength on all three pickup coils were close to each other.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A physically integrated eddy current measurement probe device for detecting a non-homogeneous object in a material, said probe comprising:
    a power supply;
    an oscillator to produce electrical excitation powered by said power supply;
    a plurality of eddy current detectors, each detector measuring eddy current density;
    a marker disposed adjacent said plurality of eddy current detectors for indicating a location on the material that corresponds to a maximum of said eddy current density as indicated by said plurality; and
    a housing for containing said power supply, said oscillator, said eddy current detectors and said marker, wherein said housing traverses over the material.

2. The eddy current measurement probe device according to claim 1, wherein said marker comprises:
    a drill bit disposed adjacent said plurality for indenting the material at said location;
    a transmission connecting to said drill bit; and
    an electric motor connecting to said transmission and powered by said power supply for rotating said drill bit.

3. The eddy current measurement probe device according to claim 1, wherein said oscillator further includes an analog-to-digital (A/D) converter.

4. The eddy current measurement probe according to claim 1, further including a display for showing measured voltage from said plurality from which to indicate said maximum of eddy current density and activate said marker.

5. The eddy current measurement probe device according to claim 1, wherein said plurality is two detectors angularly separated by 180°.

6. The eddy current measurement probe device according to claim 1, wherein said plurality is three detectors angularly separated by 120°.

7. The eddy current measurement probe device according to claim 1, wherein said power supply is a direct current battery.

8. The eddy current measurement probe device according to claim 1, wherein said marker includes an actuator.

9. The eddy current measurement probe device according to claim 1, wherein said marker applies an ink drop at said location.

* * * * *